United States Patent
Garb

(10) Patent No.: US 8,232,683 B2
(45) Date of Patent: Jul. 31, 2012

(54) RELOCATABLE POWER TAP

(75) Inventor: Jeffrey W. Garb, West Hills, CA (US)

(73) Assignee: Belkin International, Inc., Playa Vista, CA (US)

( * ) Notice: Subject to any disclaimer, the term of this patent is extended or adjusted under 35 U.S.C. 154(b) by 624 days.

(21) Appl. No.: 12/428,468

(22) Filed: Apr. 22, 2009

(65) Prior Publication Data

US 2009/0289501 A1 Nov. 26, 2009

Related U.S. Application Data

(60) Provisional application No. 61/047,070, filed on Apr. 22, 2008, provisional application No. 61/155,468, filed on Feb. 25, 2009.

(51) Int. Cl.
*H01H 35/00* (2006.01)
(52) U.S. Cl. .......................................................... 307/116
(58) Field of Classification Search .................. 307/116, 307/117, 125
See application file for complete search history.

(56) References Cited

U.S. PATENT DOCUMENTS

| 4,097,843 | A | 6/1978 | Basile |
| 4,120,031 | A | 10/1978 | Kincheloe et al. |
| 4,331,122 | A | 5/1982 | Sohner et al. |
| 4,816,746 | A | 3/1989 | Peak |
| 4,829,289 | A | 5/1989 | Kallman et al. |
| 4,901,007 | A | 2/1990 | Sworm |
| 4,931,725 | A | 6/1990 | Hutt et al. |
| 5,225,816 | A | 7/1993 | Lebby et al. |
| 5,424,903 | A | 6/1995 | Schreiber |
| 5,589,764 | A | 12/1996 | Lee |
| 5,793,352 | A | 8/1998 | Greenberg et al. |
| 5,869,960 | A | 2/1999 | Brand |
| 6,095,850 | A | 8/2000 | Liu |
| 6,367,024 | B1 | 4/2002 | Ezell |
| 6,555,990 | B1 | 4/2003 | Yang |
| 7,332,834 | B2 | 2/2008 | Lee |
| 7,540,767 | B1 | 6/2009 | Czarnecki |
| 7,677,921 | B2 | 3/2010 | Czarnecki |
| 2003/0103366 | A1 | 6/2003 | MacDonald et al. |
| 2005/0146219 | A1 | 7/2005 | Pincu et al. |
| 2005/0215285 | A1 | 9/2005 | Lin |
| 2009/0009936 | A1 | 1/2009 | Neu et al. |
| 2009/0289501 | A1 | 11/2009 | Garb |
| 2009/0294150 | A1 | 12/2009 | McGinley et al. |
| 2009/0295226 | A1* | 12/2009 | Hodges et al. ................. 307/39 |
| 2009/0295232 | A1 | 12/2009 | McGinley et al. |
| 2009/0295233 | A1 | 12/2009 | McGinley et al. |
| 2009/0295327 | A1 | 12/2009 | McGinley et al. |

(Continued)

FOREIGN PATENT DOCUMENTS

DE 4426509 8/1996

(Continued)

OTHER PUBLICATIONS

Hong Kong Electronics, vol. 5, Hong Kong Development Counsel 1966, 2 pages. 1996.

(Continued)

*Primary Examiner* — Daniel Cavallari
(74) *Attorney, Agent, or Firm* — Bryan Cave LLP

(57) ABSTRACT

A system includes one or more constant "on" outlets, one or more controlled outlets, a two-part power supply, and accompanying circuitry. Other embodiments are also disclosed herein.

27 Claims, 10 Drawing Sheets

U.S. PATENT DOCUMENTS

2009/0322160 A1    12/2009    Dubose et al.

FOREIGN PATENT DOCUMENTS

| GB | 2041588 | 9/1980 |
|---|---|---|
| JP | 0038587 | 3/1979 |
| JP | 4-315964 | 11/1992 |
| JP | 8-184616 | 7/1996 |
| WO | 8605887 | 10/1986 |
| WO | 2004008649 | 1/2004 |

OTHER PUBLICATIONS

Hong Kong Electronics, Hong Kong Development Council 1997, 2 pages. Aug. 1997.

Hong Kong Electronics, Hong Kong Development Council 1997, 2 pages. Oct. 1997.

Hong Kong Electronics, Hong Kong Development Council 1997, 2 pages. Dec. 1997.

Bluelounge—The Sanctuary, http://www.bluelounge.com/products/thesanctuary, 3 pages. Retrieved Aug. 27, 2010.

Bluelounge—Extra Connectors, http://www.bluelounge.com/products/thesanctuary, 3 pages. Retrieved Aug. 27, 2010.

International Search Report for PCT Application No. PCT/US2011/020286, 13 pages. Mar. 15, 2011.

* cited by examiner

RELOCATABLE POWER TAP

CROSS-REFERENCE TO RELATED APPLICATIONS

This application claims the benefit of U.S. Provisional Application Ser. No. 61/047,070, filed on Apr. 22, 2008, and U.S. Provisional Application Ser. No. 61/155,468, filed on Feb. 25, 2009, both of which are incorporated herein by reference in their entirety.

TECHNICAL FIELD

Subject matter described herein relates to power supply devices, and more particularly to the internal power management of power supplies for electronic devices.

BACKGROUND

Electronic devices of all types have become more and more common in everyday life. Electronic devices include non-portable devices as well as portable devices. Examples of non-portable electronic devices include wired telephones, routers (wired and wireless), wireless access points (WAPs) and the like. Examples of portable electronic devices include cellular phones, personal data assistants (PDAs), combination cellular phone and PDAs (e.g., a Blackberry® device available from Research in Motion (RIM®) of Ontario, Canada), cellular phone accessories (e.g., a Bluetooth® enabled wireless headset), MP3 (Moving Pictures Experts Group-1 Audio Layer 3) players (e.g., an iPod® device by Apple Inc. (Apple®) of Cupertino, Calif.), compact disc (CD) players, and digital video disk (DVD) players. Along with the positive benefits of use of such devices comes the requirement to power the devices and/or communicate with them. Power supplies use power even when not supplying power to electronic devices that are in electrical communication with the power supplies. Reducing the administrative power consumption of the power supplies for such devices can prove difficult.

BRIEF DESCRIPTION OF THE DRAWINGS

To facilitate further description of the embodiments, the following drawings are provided in which.

Figure 1:
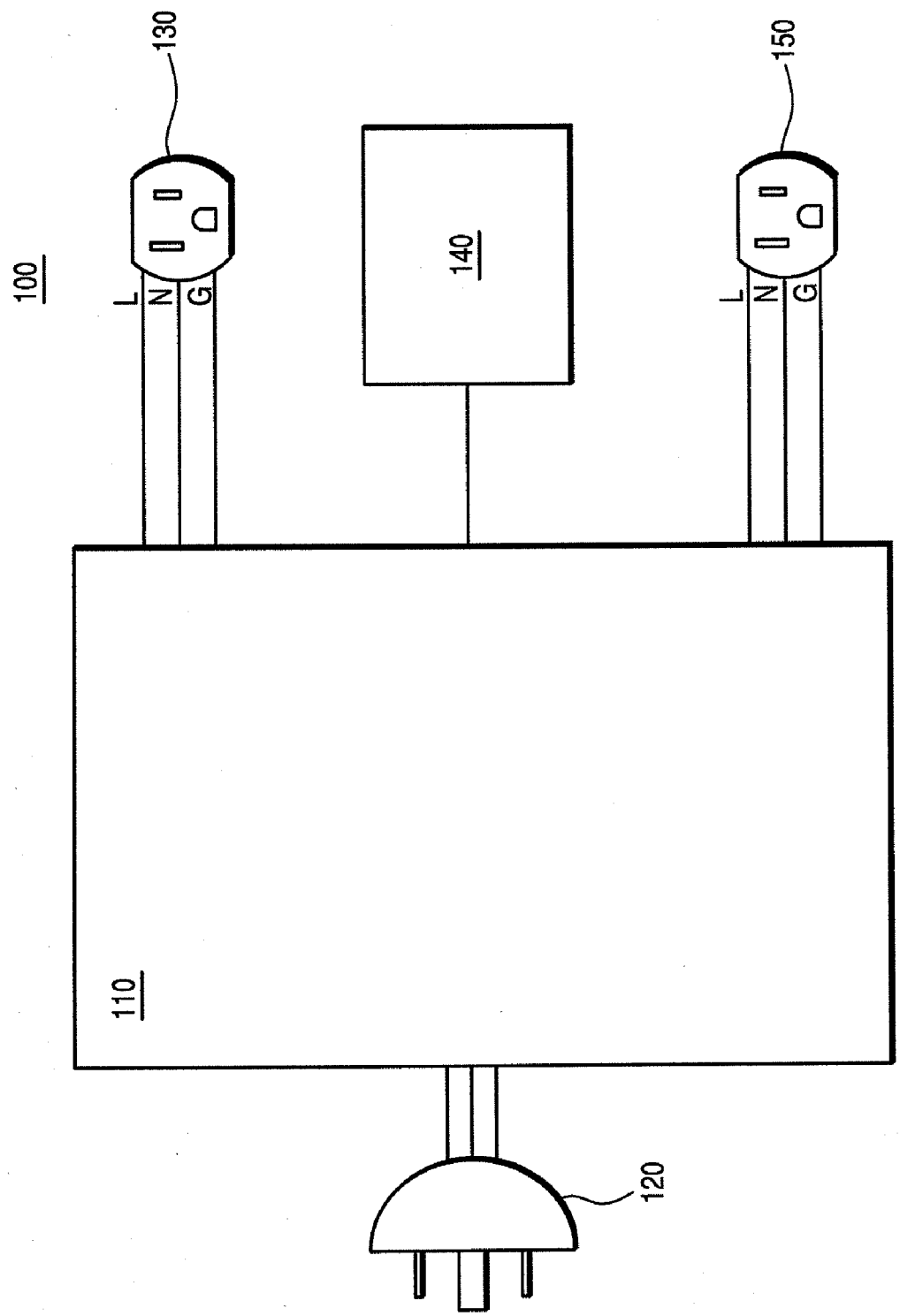
FIG. 1 is a block diagram illustrating an improved power supply including aspects of the subject matter described herein.

The phrase "subject matter described herein" refers to subject matter described in the Detailed Description unless the context clearly indicates otherwise. The term "aspects" is to be read as "at least one aspect." Identifying aspects of the subject matter described in the Detailed Description is not intended to identify key or essential features of the claimed subject matter. The aspects described above and other aspects of the subject matter described herein are illustrated by way of example and not limited in the accompanying figures in which like reference numerals indicate substantially similar elements.

For simplicity and clarity of illustration, the drawing figures illustrate the general manner of construction, and descriptions and details of well-known features and techniques may be omitted to avoid unnecessarily obscuring aspects of the subject matter described herein. Additionally, elements in the drawing figures are not necessarily drawn to scale. For example, the dimensions of some of the elements in the figures may be exaggerated relative to other elements to help improve understanding of embodiments of the subject matter described herein.

The terms "first," "second," "third," "fourth," and the like in the Detailed Description and in the claims, if any, are used for distinguishing between similar elements and not necessarily for describing a particular sequential or chronological order. It is to be understood that the terms so used are interchangeable under appropriate circumstances such that the embodiments of the subject matter described herein are, for example, capable of operation in sequences other than those illustrated or otherwise described herein. Furthermore, the terms "include," and "have," and any variations thereof, are intended to cover a non-exclusive inclusion, such that a process, method, system, article, or apparatus that comprises a list of elements is not necessarily limited to those elements, but may include other elements not expressly listed or inherent to such process, method, article, or apparatus.

The terms "left," "right," "front," "back," "top," "bottom," "over," "under," and the like in the Detailed Description and in the claims, if any, are used for descriptive purposes and not necessarily for describing permanent relative positions. It is to be understood that the terms so used are interchangeable under appropriate circumstances such that the aspects of the subject matter described herein are, for example, capable of operation in other orientations than those illustrated or otherwise described herein. The term "on," as used herein, is defined as on, at, or otherwise substantially adjacent to or next to or over.

The terms "couple," "coupled," "couples," "coupling," and the like should be broadly understood and refer to connecting two or more elements or signals, electrically, mechanically, or otherwise, either directly or indirectly through intervening circuitry and/or elements. Two or more electrical elements may be electrically coupled, either direct or indirectly, but not be mechanically coupled; two or more mechanical elements may be mechanically coupled, either direct or indirectly, but not be electrically coupled; two or more electrical elements may be mechanically coupled, directly or indirectly, but not be electrically coupled. Coupling (whether only mechanical, only electrical, both, or otherwise) may be for any length of time, e.g., permanent or semi-permanent or only for an instant.

"Electrical coupling" and the like should be broadly understood and include coupling involving any electrical signal, whether a power signal, a data signal, and/or other types or combinations of electrical signals. "Mechanical coupling" and the like should be broadly understood and include mechanical coupling of all types.

The absence of the word "removably," "removable," and the like near the word "coupled," and the like does not mean that the coupling, etc. in question is or is not removable. For example, the recitation of a clip being coupled to an outer casing does not mean that the clip cannot be removed (readily or otherwise) from, or that it is permanently connected to, the outer casing.

DETAILED DESCRIPTION OF EXAMPLES OF EMBODIMENTS

FIG. 1 is a block diagram illustrating an embodiment of an exemplary system for providing a multi-outlet controlled power strip including multiple inputs, surge protection and incorporating an improved power supply. FIG. 1 includes power strip 100 (also called a relocatable power tap (RPT)) including control circuitry 110, power plug 120, constant "on" outlet(s) 130, command input device 140 and controlled outlet(s) 150. Control circuitry 110 is a circuit configured to receive power signals and disperse power signals to constant "on" outlet(s) 130 and possibly command input device 140 if so configured, and further disperse power signals to controlled outlet(s) 150 based on input received from command input device 140. Control circuitry 110 can include some or all the improved power supply circuitry that is detailed in FIGS. 2-4 as well as in FIGS. 6-8 below. In some embodiments, control circuitry 110 additionally includes protection circuitry. Protection circuitry is described in FIG. 2 and specifically detailed in FIG. 5, below.

Power plug 120 is an electrical conduit that is physically coupled to and in electrical communication with control circuitry 110. Power plug 120 is configured to pass a power signal received from a power source to control circuitry 110 when power plug 120 is physically coupled to and in electrical communication with a power source (not shown). Constant "on" outlet(s) 130 are a power outlet that are physically coupled to and in constant electrical communication with control circuitry 110 and are further configured to pass a power signal received from control circuitry 110 to any device with which it is in electrical communication.

Command input device 140 is any input device that is physically coupled to and in electrical communication with control circuitry 110 and is further configured to pass a command signal to control circuitry 110 based on a received command signal or command action that command input device 140 received previously. Controlled outlet(s) 150 are a power outlet that are physically coupled to and in controlled electrical communication with control circuitry 110 and are further selectively configured to pass a power signal received from control circuitry 110 to any device with which it is in electrical communication. Command input device 140 can be implemented as any suitable command input device, such as, for example a master outlet as part of a master/slave power strip configuration providing a control signal to control circuitry 110 by drawing current from control circuitry 110, a receiver device providing a control signal to control circuitry 110, a sensing device providing a control signal to control circuitry 110, and the like. Examples of a receiver device providing a control signal to control circuitry 110 include a radio frequency (RF) receiver, a light emitting diode (LED) receiver, a wireless networked receiver, a short range wireless receiver that is part of a personal area network (PAN), and the like.

In operation, when power plug 120 is operably coupled to and in electrical communication with an appropriate power source (e.g., an alternating current (a.c.) or other power outlet fixture), power becomes available to constant "on" outlet(s) 130 and command input device 140, as appropriate. At this time, if command input device 140 has not provided an appropriate command signal to control circuitry 110, power is NOT available to controlled outlet(s) 150, and any device(s) operably coupled to and in electrical communication with controlled outlet(s) 150 will NOT receive any current or power. Control circuitry 110 is configured to detect when a control signal is received from command input device 140. In an example, when command input device 140 provides an "on" control signal to control circuitry 110, control circuitry 110 will provide power to controlled outlet(s) 150 thereby providing current and/or power to any devices coupled to and in electrical communication with controlled outlet(s) 150. Similarly, when command input device 140 provides an "off" control signal to control circuitry 110 and then changes the control signal to an "on" control signal, control circuitry 110 will provide power to controlled outlet(s) 150 thereby providing current and/or power to any devices coupled to and in electrical communication with controlled outlet(s) 150.

The exemplary configuration illustrated in FIG. 1 allows a user, via constant "on" outlet(s) 130, the flexibility to assign certain devices (e.g., a clock, cable/satellite receiver, etc.) to be supplied with constant power as well as determine when other devices receive power. Additionally, the configuration allows a user, via command input device 140 and controlled outlet(s) 150, to control when power is supplied to a primary device (e.g., a personal computer, such as, a laptop or desktop computer) as well as or in addition to secondary devices, such as, peripherals (e.g., printers, scanners, etc.).

Figure 2:
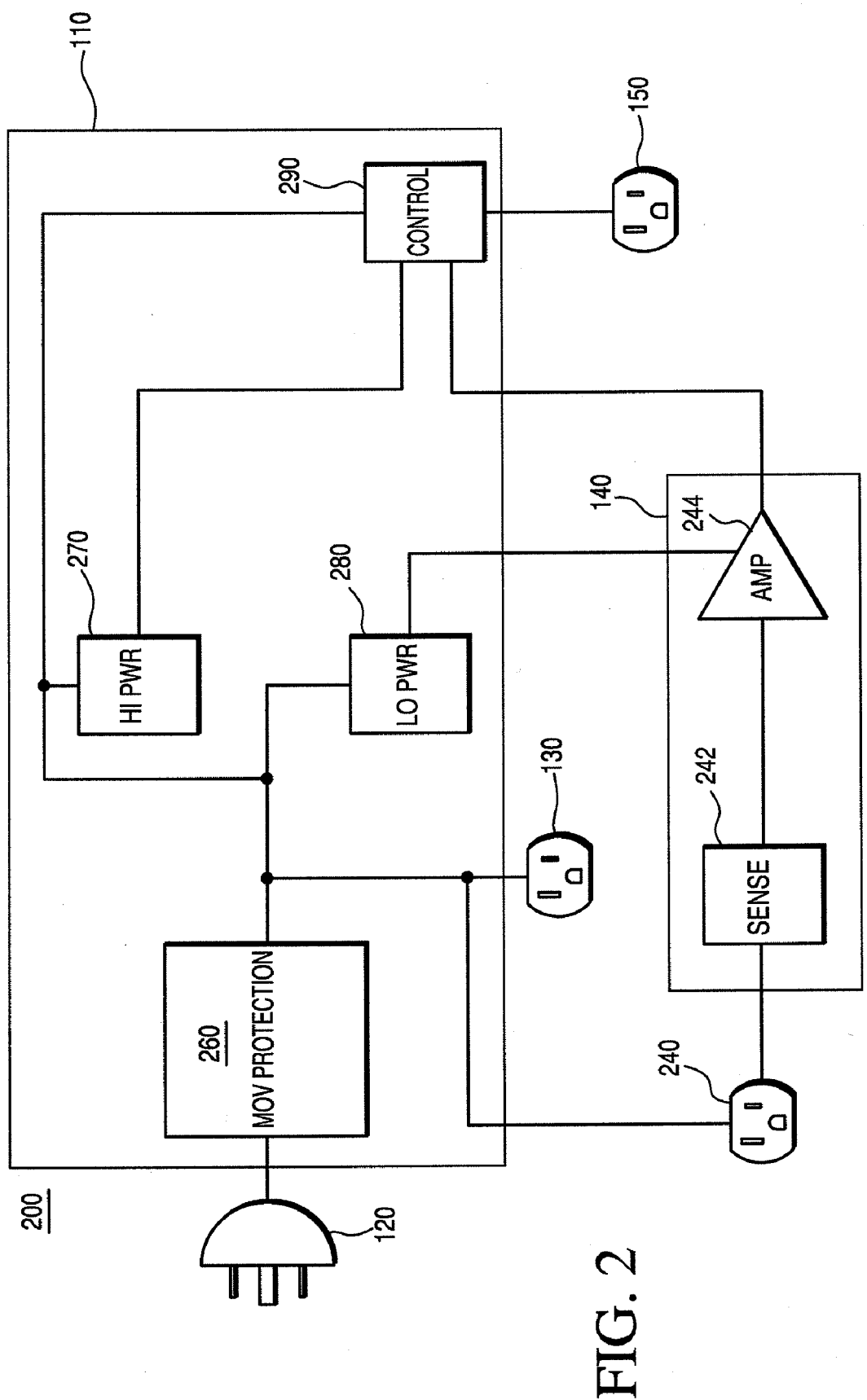
FIG. 2 is a block diagram illustrating an embodiment of the improved power supply of FIG. 1 including aspects of the subject matter described herein.

FIG. 2 is a block diagram illustrating an embodiment of an exemplary system for providing a multi-outlet controlled power strip including surge protection and incorporating an improved power supply. The power strip 200 in FIG. 2 is a detailed view of power strip 100 of FIG. 1. As shown in FIG. 2, power strip 200 includes: control circuitry 110, power plug 120, constant "on" outlet(s) 130, command input device 140 (configured as a master outlet) and controlled outlet(s) 150. Control circuitry 110 includes metal oxide varistors (MOV) protection circuit 260, hi-power (HI PWR) circuit 270, low-power (LO PWR) circuit 280 and control circuit 290. Command input device 140 includes master outlet 240, sensing (SENSE) circuit 242 amplification (AMP) circuit 244. Elements numbered as in FIG. 1 function in a substantially similarly way.

MOV protection circuit 260 has an input and an output. The input of MOV protection circuit 260 is electrically coupled and in communication with power plug 120. The output of MOV protection circuit 260 is electrically coupled and in communication with constant "on" outlet(s) 130, master outlet 240 portion of command input device 140, HI PWR circuit 270, LO PWR circuit 280, and control circuit 290. MOV protection circuit 260 receives a power signal from power plug 120 and provides protected power signals to constant "on" outlet(s) 130, command input device 140, HI PWR circuit 270, LO PWR circuit 280, and control circuit 290. An embodiment of MOV protection circuit 260 is described in FIG. 5, below. In operation, MOV protection circuit 260 provides one or more of the following: conditions the received power signal to, among other things, reduce incoming radiated and conducted high frequency signals and noise; reduces the amplitude of incoming overvoltage spikes/surges; provides protection for power strip 200 from defective MOV units within MOV protection circuit 260; and determines the presence of a ground connection as well as communicate that information to a user. In short, MOV protection circuit 260 provides protected power to all other circuitry and outlets within power strip 200.

HI PWR circuit 270 has an input and an output. The input of HI PWR circuit 270 is electrically coupled and in communication with MOV protection circuit 260, constant "on" outlet(s) 130, master outlet 240 portion of command input device 140 and LO PWR circuit 280. The output of HI PWR circuit 270 is electrically coupled and in communication with control circuit 290. LO PWR circuit 280 has an input and an output. The input of LO PWR circuit 280 is electrically coupled and in communication with MOV protection circuit 260, constant "on" outlet(s) 130, master outlet 240 portion of command input device 140 and HI PWR circuit 270. The output of LO PWR circuit 280 is electrically coupled and in communication with AMP circuit 244 portion of command input device 140. HI PWR circuit 270 and LO PWR circuit 280 each receive a protected alternating current (AC) power signal from MOV protection circuit 260 and generate different levels of low voltage power for the internal circuitry of power strip 200. HI PWR circuit 270 and LO PWR circuit 280 efficiently convert line AC power to the voltages required to operate control circuit 290 and AMP circuit 244, respectively. HI PWR circuit 270 and LO PWR circuit 280 can be optimized to take advantage of the most efficient power levels to run the internal circuitry of power strip 200. In operation, LO PWR circuit 280 supplies real power to AMP circuit 244, and HI PWR circuit 270 supplies real power to the control circuit 290 allowing for efficient use of power. The uniqueness of this approach as compared to a more traditional single power supply approach is that a power savings as high as 4 to 1 can be achieved over the traditional method. An embodiment of HI PWR circuit 270 and LO PWR circuit 280 and the advantages of utilizing this configuration are further described in FIGS. 6-8, below.

Control circuit 290 has an input and an output. The input of control circuit 290 is electrically coupled and in separate communication with MOV protection circuit 260, HI PWR circuit 270 and AMP circuit 244 portion of command input device 140. The output of control circuit 290 is electrically coupled and in communication with controlled outlet(s) 150. Control circuit 290 receives a real power signal from HI PWR circuit 270 and additionally receives a driving signal from AMP circuit 244 when a device that is plugged into master outlet 240 portion of command input device 140 is drawing enough power to be active. When control circuit 290 receives the driving signal from AMP circuit 244, control circuit 290 allows current to flow between MOV protection circuit 260 and controlled outlet(s) 150.

SENSE circuit 242 of command input device 140 includes an input and an output. The input of SENSE circuit 242 is electrically coupled and in communication with master outlet 240 of command input device 140. The output of SENSE circuit 242 is electrically coupled and in communication with AMP circuit 244 of command input device 140. SENSE circuit 242 monitors an output signal from master outlet 240 and provides a sensing signal to AMP circuit 244 indicating whether or not master outlet 240 is in use or is at least drawing current above a threshold or minimum predetermined valve. In operation, SENSE circuit 242 determines that master outlet 240 is drawing current when a device that is in electrical communication with master outlet 240 is drawing enough current to exceed a current threshold, such as drawing enough current to power the device in an "ON" state. In such a situation, SENSE circuit 242 produces a sensing signal in response to master outlet 240 drawing at least a predetermined amount of current and provides the created sensing signal to AMP circuit 244. In some embodiments, SENSE circuit 242 is powered by master outlet 240 because master outlet 240 is always "ON." In such embodiments, current drawn from master outlet 240 that is monitored by SENSE circuit 242 can exclude the current (and power) that SENSE circuit 242 requires to run, and/or SENSE circuit 242 can be programmed (by hardware, software, or otherwise) or adjusted to account for the current (and power) that SENSE circuit 242 draws from master outlet 240.

AMP circuit 244 of command input device 140 includes an input and an output. The input of AMP circuit 244 is electrically coupled and in separate communication with SENSE circuit 242 and LO PWR circuit 280. The output of AMP circuit 244 is electrically coupled and in communication with control circuit 290. AMP circuit 244 receives a real power signal from LO PWR circuit 280 and additionally receives a sensing signal from SENSE circuit 242 that is based on the status of master outlet 240. AMP circuit 244 compares the signal received from SENSE circuit 242 to a threshold to determine whether master outlet 240 is "on." If the signal received from SENSE circuit 242 equals or exceeds a threshold value, AMP circuit 244 generates a driving signal and provides the generated driving signal to control circuit 290.

In operation, power strip 200 enables a user to configure the power strip to utilize one primary device (e.g., a personal computer, such as, a laptop or desktop computer) in electrical communication with command input device 140 configured as a master/slave device to control when power is supplied to secondary devices, such as, peripherals (e.g., printers, scanners, etc.), desk lighting, and the like. In the same or a different embodiment, when a primary device is in "standby" state and is coupled to and in electrical communication with command input device 140 configured as a master/slave device, the primary device will receive current from command input device 140, but the amount of current will be lower than when the device is in the "on" state. In this "standby" state, the device is receiving current at a level that is below a predetermined threshold level. In an example of this embodiment, power strip 200 treats the "standby" state similar to the "off" state such that, in both of these states: (1) command input device 140 is not providing sufficient power or current to the primary device that is coupled to and in electrical communication with command input device 140; and (2) control circuitry 110 will not provide power to controlled outlet(s) 150 and, therefore, will not provide current to any secondary devices coupled to and in electrical communication with controlled outlet(s) 150. An example of this embodiment can occur when the primary device is a television.

Figure 3:
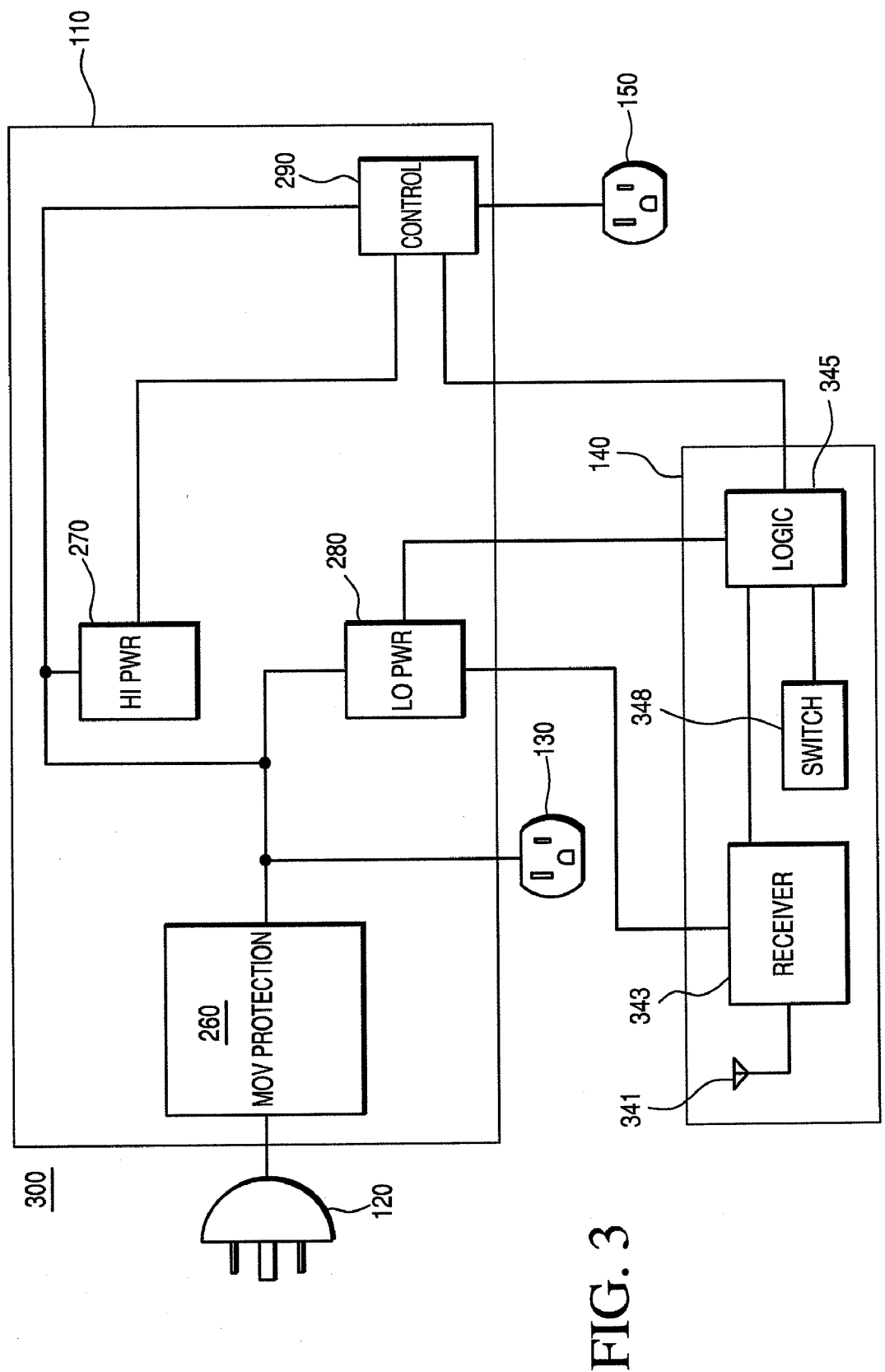
FIG. 3 is a block diagram illustrating another embodiment of the improved power supply of FIG. 1 including aspects of the subject matter described herein.

FIG. 3 is a block diagram illustrating another embodiment of an exemplary system for providing a multi-outlet controlled power strip including surge protection and incorporating an improved power supply. Power strip 300 in FIG. 3 is a detailed view of power strip 100 of FIG. 1. As shown in FIG. 3, power strip 300 includes: control circuitry 110, power plug 120, constant "on" outlet(s) 130, command input device 140 (configured as a wireless receiver) and controlled outlet(s) 150. Control circuitry 110 includes metal oxide varistors (MOV) protection circuit 260, hi-power (HI PWR) circuit 270, low-power (LO PWR) circuit 280 and control circuit 290. Command input device 140 includes antenna 341, receiver circuit 343, logic circuit 345 and switch 348. Elements numbered as in FIGS. 1 and/or 2 function in a substantially similarly way.

Antenna 341 of command input device 140 includes an input and an output. The input of antenna 341 is wirelessly coupled and in communication with a transmitter (not shown). The output of antenna 341 is electrically coupled and in communication with receiver circuit 343 of command input device 140. Antenna 341 takes in radiated signals, which include information such as commands, in the form of waves of energy, known as electromagnetic signals, via cable, wire, ambient air, sensors or other mediums. Antenna 341 passes the received signals to receiver circuit 343. In one embodiment, antenna 341 can be a portion of the circuit board that is part of receiver circuit 343, a wire antenna, or a commercially available antenna. Command input device 140 additionally includes switch 348. Switch 348 includes an input and an output. The input of switch 348 is configured to receive commands from a user. The output of switch 348 is electrically coupled to and in communication with logic circuit 345. In some embodiments, switch 348 is implemented as a manual switch. In other embodiments, switch 348 may be implemented as any other user input device capable of performing similar functionality including a mechanical switch in physical communication with logic circuit 345 and the like.

Receiver circuit 343 of command input device 140 includes an input and an output. The input of receiver circuit 343 is electrically coupled and in communication with antenna 341, and the output of receiver circuit 343 is electrically coupled and in communication with logic circuit 345. In one embodiment, receiver circuit 343 is electrically coupled and in communication with LO PWR circuit 280. Receiver circuit 343 is configured to receive received signals from antenna 341, produce a command signal and pass the produced command signal to logic circuit 345. Receiver circuit 343 typically includes a tuner, a detector and an amplifier. The tuner resonates at a particular frequency and amplifies the resonant frequency. The detector detects the command signal within the received signal and extracts the command signal from the received signal. The amplifier amplifies the received command signal. In other embodiments, the same or different components provide substantially similar functionality and may combine functionality of the above described components. Receiver circuit 343 can be implemented as any suitable receiver circuit.

Logic circuit 345 of command input device 140 includes an input and an output. The input of logic circuit 345 is electrically coupled and in communication with receiver circuit 343, switch 348 and LO PWR circuit 280. The output of logic circuit 345 is electrically coupled and in communication with control circuit 290. Logic circuit 345 receives a received command signal from receiver circuit 343, generates an operational signal based on the logic within logic circuit 345 and passes the generated operational signal to control circuit 290. Logic circuit 345 can be implemented as any suitable logic circuit.

In operation, power strip 300 enables a user to wirelessly control the power strip to control when power is supplied to devices, such as, a personal computer or peripherals that are in electrical communication with controlled outlet(s) 150. In the same or a different embodiment, a user can wirelessly control power strip 300 using one or a number of electromagnetic methodologies, such as, for example infrared spectrum, wireless networking spectrum including personal area network (PAN) spectrum, radio frequency (RF) spectrum, light emitting diode (LED) spectrum, and the like. In one embodiment, power strip 300 enables a user to reduce power consumption of the devices in electrical communication with controlled outlet(s) 150 by allowing a user to completely shut power off to her deices.

Figure 4:
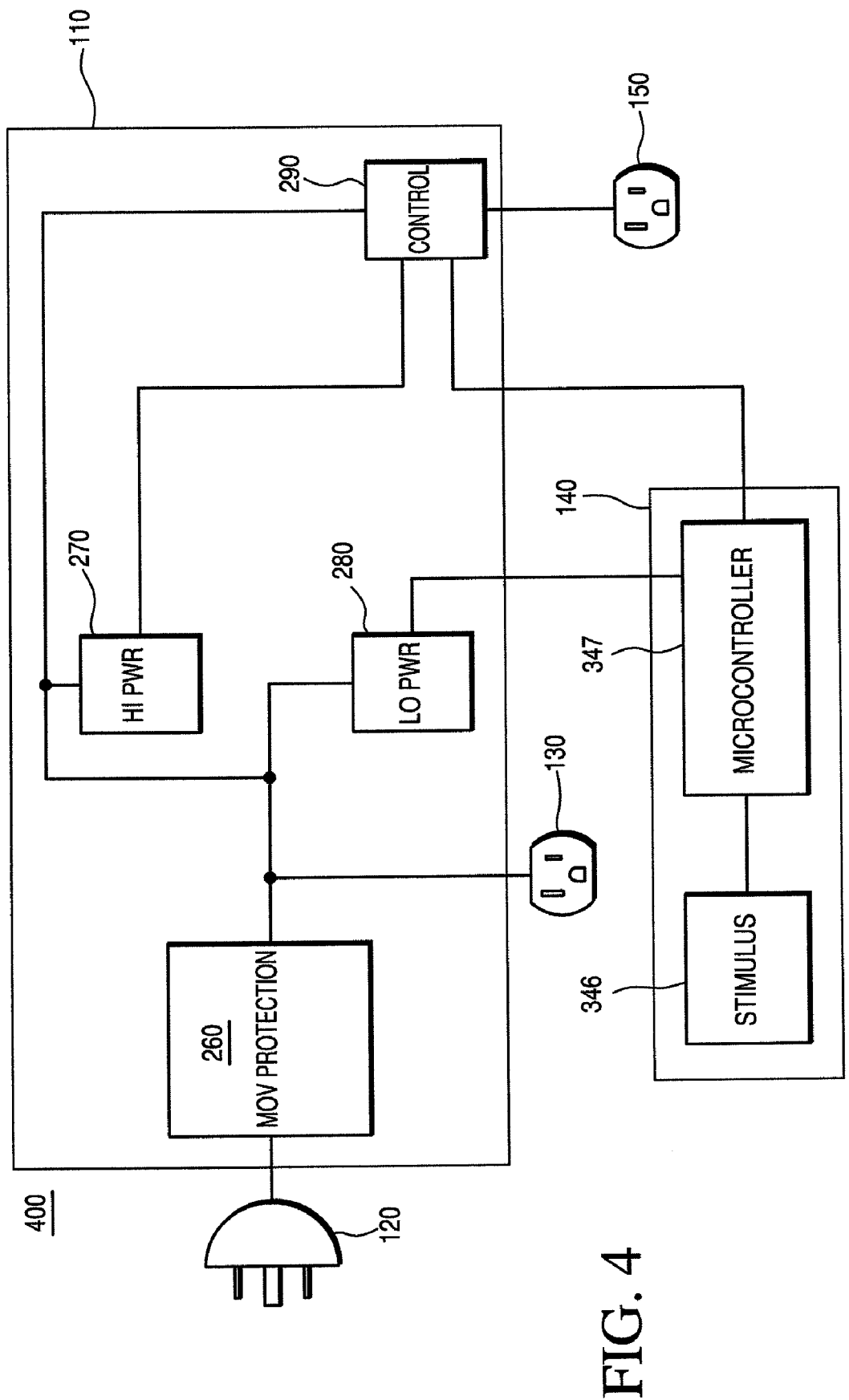
FIG. 4 is a block diagram illustrating yet another embodiment of the improved power supply of FIG. 1 including aspects of the subject matter described herein.

FIG. 4 is a block diagram illustrating another embodiment of an exemplary system for providing a multi-outlet controlled power strip including surge protection and incorporating an improved power supply. Power strip 400 in FIG. 4 is a detailed view of power strip 100 of FIG. 1. As shown in FIG. 4, power strip 400 includes: control circuitry 110, power plug 120, constant "on" outlet(s) 130, command input device 140 (configured as a wireless receiver) and controlled outlet(s) 150. Control circuitry 110 includes metal oxide varistors (MOV) protection circuit 260, hi-power (HI PWR) circuit 270, low-power (LO PWR) circuit 280 and control circuit 290. Command input device 140 includes stimulus circuit 446 and microcontroller 447. Elements numbered as in FIGS. 1 and/or 2 function in a substantially similarly way.

Stimulus circuit 446 of command input device 140 includes an input and an output. The input of stimulus circuit 446 is configured to actively or passively sense/detect the presence of a required body within a specified area of the power strip incorporating stimulus circuit 446, such as, for example that of a user within a given distance of power strip 400. In one embodiment, stimulus circuit 446 receives power from microcontroller 447, and in a different embodiment (not shown), stimulus circuit 446 receives power from LO PWR circuit 280. The output of stimulus circuit 446 is electrically coupled and in communication with microcontroller 447 of command input device 140. In some embodiments, stimulus circuit 446 uses an active methodology by radiating energy waves into the area surrounding power strip 400, receiving reflected energy waves from surrounding objects and then producing a command signal which is passed to microcontroller 447. Examples of active energy waves that may be utilized by stimulus circuit 446 include ultrasonic spectrum, radio frequency (RF) spectrum, light emitting diode (LED) spectrum, and the like. In other embodiments, stimulus circuit 446 uses a passive methodology by sensing energy from the area surrounding power strip 400 and then producing a command signal which is passed to microcontroller 447. Examples of active energy waves that may be utilized by stimulus circuit 446 include infrared spectrum, audio spectrum and the like. Stimulus circuit 446 can be implemented as any suitable circuitry.

Microcontroller 447 of command input device 140 includes an input and an output. The input of microcontroller 447 is electrically coupled and in communication with stimulus circuit 446 and LO PWR circuit 280. The output of microcontroller 447 is electrically coupled and in communication with control circuit 290. Microcontroller 447 receives a command signal from stimulus circuit 446, generates an operational signal based on the logic within microcontroller 447 and passes the generated operational signal to control circuit 290. Microcontroller 447 can be implemented as any suitable logic circuit.

In operation, power strip 400 enables a user to control the power strip and determine when power is supplied to devices, such as, a personal computer or peripherals that are in electrical communication with controlled outlet(s) 150. In the same or a different embodiment, a user can control power strip 400 and determine when a user may be nearby using one or a number of active methodologies, such as, for example ultrasonic spectrum, radio frequency (RF) spectrum, light emitting diode (LED) spectrum, and the like. In other embodiments, a user can control power strip 400 and determine when a user may be nearby using one or a number of passive methodologies, such as, for example infrared spectrum, audio spectrum and the like. In one embodiment, power strip 400 enables a user to reduce power consumption of the devices in electrical communication with controlled outlet(s) 150 by allowing a user to completely shut power off to her devices until stimulus circuit 446 determines one or more specific criteria have been met.

Figure 5:
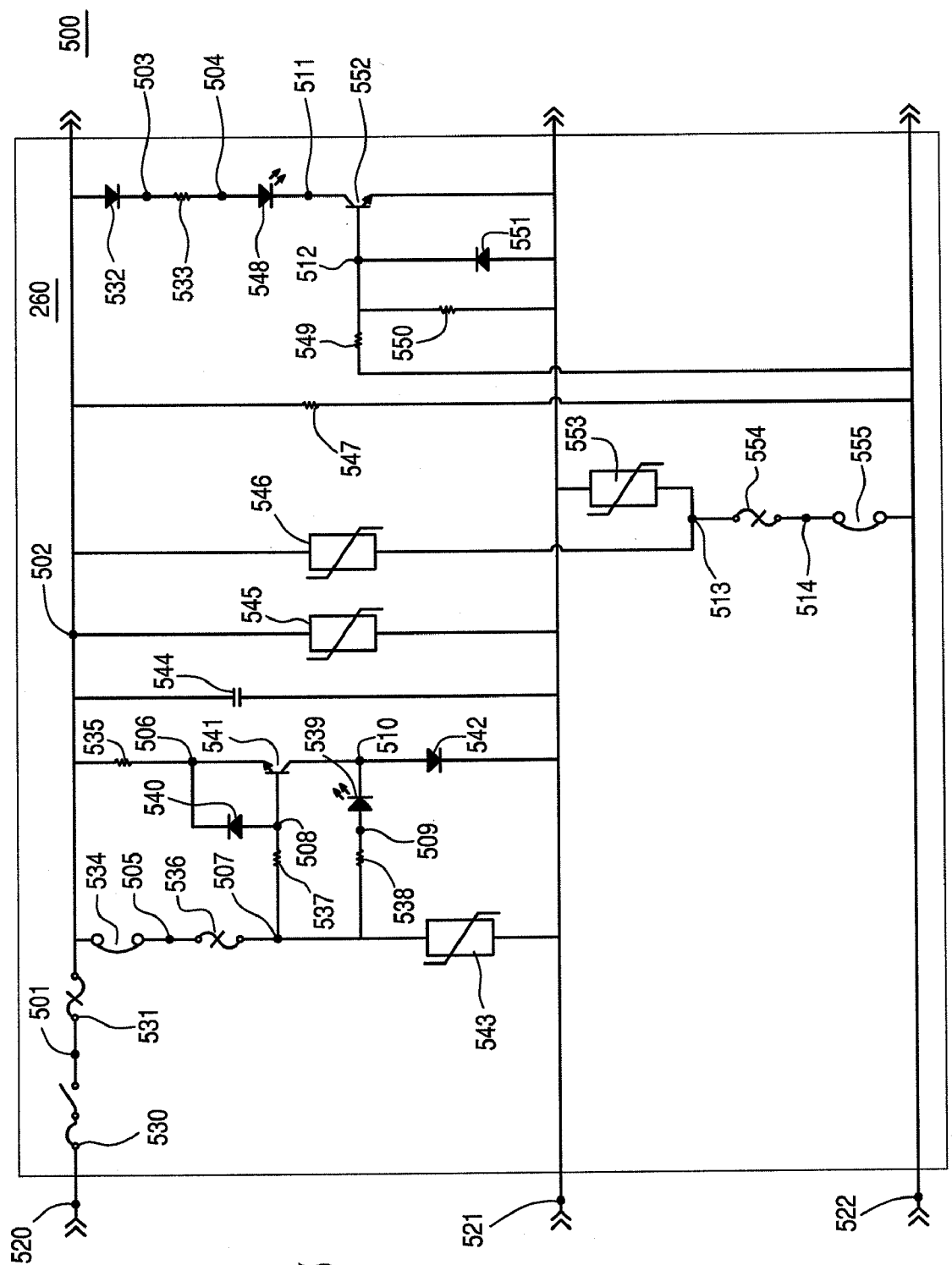
FIG. 5 is a schematic diagram illustrating an embodiment of a metal oxide varistor (MOV) protection circuit portion of FIGS. 2-4 including aspects of the subject matter described herein.

FIG. 5 is a circuit schematic diagram illustrating an embodiment of an exemplary MOV protection circuit 500, such as, for example MOV protection circuit 260 of FIGS. 2-4 above. MOV protection circuit 500 performs the functionality as described in FIGS. 2-4 above by receiving raw power from a power source and providing protected, real power to the remainder of the elements within the circuit, such as, the additional elements described in FIG. 2-4, above. The concepts underlying MOV protection circuit 500 are known in the art, and therefore only certain portions of MOV protection circuit 500 will be described herein. MOV protection circuit 500 includes a line node 520, a neutral node 521 and a ground node 522 as well as numerous other nodes 501-514. Node 520 is in electrical communication with a line voltage. Node 521 is in electrical communication with the neutral line. Node 522 is in electrical communication with ground.

In FIG. 5, circuit breaker 530 is located between node 520 and node 501, and thermal fuse 531 is located between node 501 and 502. Diode 532 includes an anode coupled to node 502 and a cathode coupled to node 503, and resistor 533 is located between node 503 and 504. Wire fuse 534 is located between node 502 and node 505, thermal fuse 536 is located between node 505 and node 507, and MOV 543 is located between node 507 and node 521. Resistor 535 is located between node 502 and node 506, capacitor 544 is located between node 502 and node 521, MOV 545 is located between node 502 and node 521, and resistor 547 is located between node 502 and node 522. Resistor 537 is located between node 507 and node 508, and diode 540 includes an anode coupled to node 508 and a cathode coupled to node 506. Bipolar junction transistor (BJT) 541 includes a base coupled to node 508, an emitter coupled to node 506 and a collector coupled to node 510. Resistor 538 is located between node 507 and node 509, and LED 539 includes an anode coupled to node 509 and a cathode coupled to node 510. Diode 542 includes an anode coupled to node 510 and a cathode coupled to node 521. MOV 546 is located between node 502 and node 513. LED 548 includes an anode coupled to node 504 and a cathode coupled to node 511. BJT 552 includes a collector coupled to node 511, a base coupled to node 512 and an emitter coupled to node 521. Resistor 549 is located between node 512 and node 522, resistor 550 is located between node 512 and node 521. Diode 551 includes a cathode coupled to node 512 and an anode coupled to node 521. MOV 553 is located between node 521 and node 513, thermal fuse 554 is located between node 513 and node 514, and wire fuse 555 is located between node 514 and node 522.

In FIG. 5, capacitor 544 reduces unwanted signals or noise from external sources. MOVs 543, 546, 553 and 545 reduce unwanted voltage spikes to acceptable levels. Bipolar junction transistor (BJT) 541 and associated components are a "crowbar circuit" to sense when MOV 543 is no longer providing protection and to completely and permanently disable the relocatable power tap, such as, power strip 200 in FIG. 2. BJT 552 and associated components determine if power strip 200 is properly grounded or not and communicate the determination to a user through some type of user interface (e.g., if not properly grounded, light emitting diode (LED) LED 548 lights up to show a fault). Resistor 550 counters the collector leakage current (Icbo) of BJT 552. Diode 532 provides direct current (DC) power for the circuit as well as diode 551, which prevents a reverse bias voltage from biasing the base of BJT 552. In this embodiment, if a connection to ground is lost or was never present, resistors 547 and 549 function to pull the base of BJT 552 "high" thereby causing BJT 552 to conduct and supply power to the light emitting diode LED 548 which when active indicates loss of ground to a user.

In FIG. 5, circuit breaker 530 can be implemented as any suitable circuit breaker. Thermal fuses 531 and 536 can be implemented as any suitable 15 amp, 125 volt thermal fuses. Thermal fuse 554 can be implemented as any suitable five amp, 125 volt thermal fuse. Diodes 540, 532 and 542 can be implemented as any suitable diodes, such as, 1N4007 diodes available from Fairchild Semiconductor Corp of San Jose, Calif. Diode 551 can be implemented as any suitable diode, such as, a 1N4148 diode available from Fairchild Semiconductor Corp of San Jose, Calif. LED 539 can be implemented as any suitable green LED. LED 548 can be implemented as any suitable red LED. Wire fuse 534 can be implemented as any suitable wire fuse having a diameter of 0.3 mm. Wire fuse 555 can be implemented as any suitable wire fuse having a diameter of 0.23 mm. MOVs 543, 546, and 553 can be implemented as any suitable MOVs, such as, GNR20D201K MOVs available from Ceramate of Luchu, Taoyuan, Taiwan. MOV 545 can be implemented as any suitable MOV. BJT 541 can be implemented as any suitable BJT, such as, a KSP94 BJT available from Fairchild Semiconductor Corp of San Jose, Calif. BJT 552 can be implemented as any suitable BJT, such as, an KSP94 BJT available from Fairchild Semiconductor Corp of San Jose, Calif. Capacitor 544 can be implemented as any suitable capacitor. Resistor 537 can be implemented as any suitable 5.1 kΩ/0.5 watt resistor. Resistor 535 can be implemented as any suitable 910Ω/2 watt flame-proof resistor. Resistors 533 and 538 can be implemented as any suitable 39 kΩ/0.25 watt resistors. Resistors 547 and 549 can be implemented as any suitable 2 MΩ/0.5 watt resistors. Resistor 550 can be implemented as any suitable 1 MΩ/0.25 watt resistor. Resister elements can be obtained from any reputable electronic parts distributor or retailer.

Although the circuit as detailed in FIG. 5 and described above is a typical solution for providing the above described functionality, the functions detailed and described may be implemented using different types of components. For example, the MOVs may be replaced with transient voltage suppressor (TVS) devices, discrete transistor circuits using integrated circuitry, or electromagnetic interference/radio frequency interference (EMI/RFI) suppression circuitry utilizing inductors, transformers and any combination of components to create the required suppression.

Figure 6:
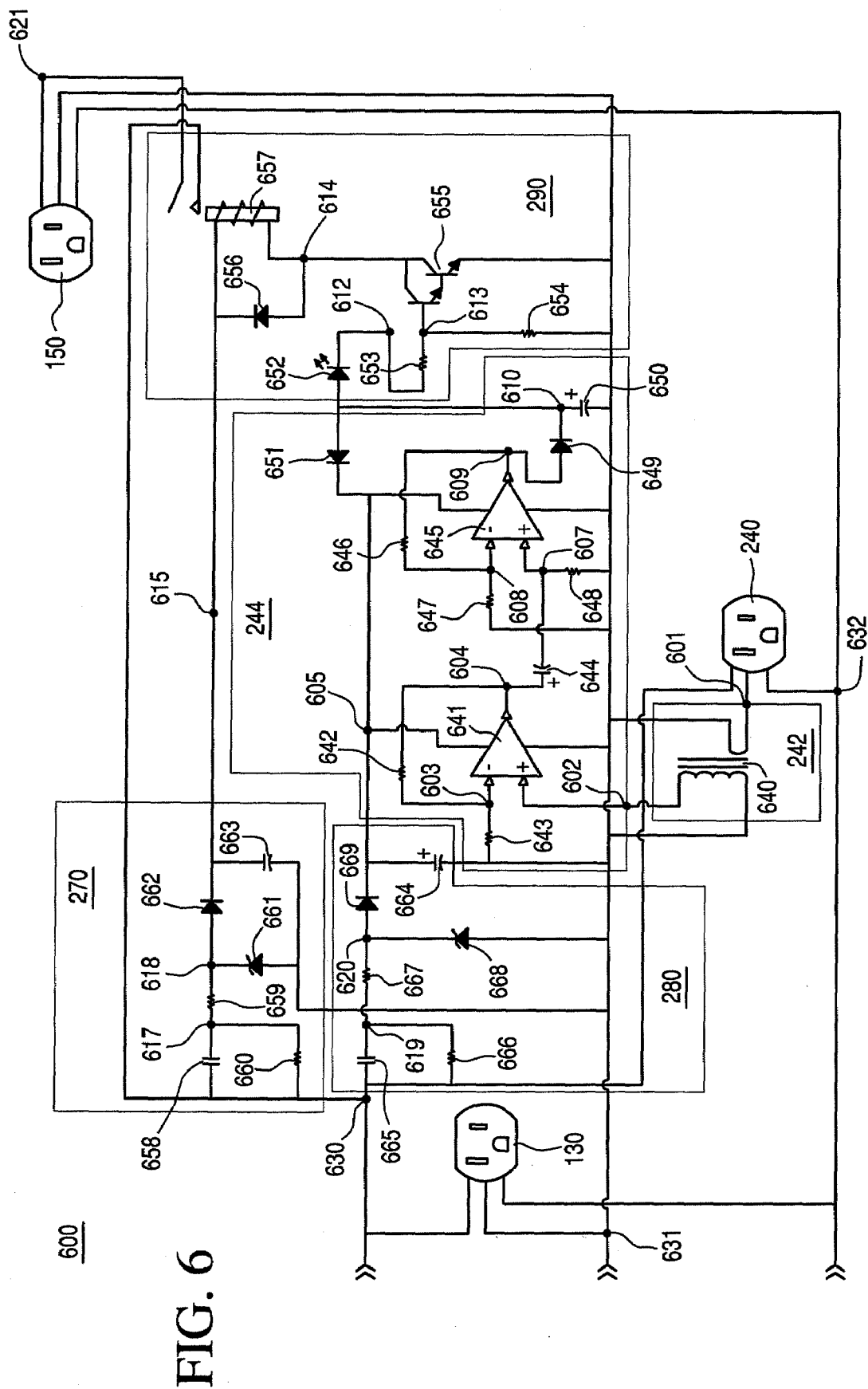
FIG. 6 is a schematic diagram illustrating an embodiment of the improved power supply of FIG. 2 that includes aspects of the subject matter described herein.

FIG. 6 is a circuit schematic diagram illustrating an embodiment of a portion of an exemplary system for providing a multi-outlet master/slave power strip incorporating an improved power supply and excluding an MOV portion. Power strip 600 in FIG. 6 is a detailed view of a portion of power strip 200 of FIG. 2, but for clarity, excludes the portion of power strip 200 disclosed and described as MOV protection circuit 500 of FIG. 5. Power strip 600 performs the functionality as described in FIG. 2 by receiving protected power, such as, from an MOV protection circuit (i.e., MOV protection circuit 260 of FIG. 2) and providing multi-outlet master/slave power strip functionality as also described in FIG. 2, above. Power strip 600 includes: master outlet 240, controlled outlet(s) 150, hi-power (HI PWR) circuit 270, low-power (LO PWR) circuit 280, sensing (SENSE) circuit 242, amplification (AMP) circuit 244 and control circuit 290. Power strip 600 includes a line node 630, a neutral node 631 and a ground node 632 as well as numerous other nodes. Node 630 is in electrical communication with a line voltage, and in one embodiment is substantially similar to node 502 in FIG. 5. Node 631 is in electrical communication with the neutral line. Node 632 is in electrical communication with ground. Elements numbered as in FIGS. 1 and/or 2 function in a substantially similarly way.

Master outlet 240 includes a plug receptacle for interfacing with a device power cord as well as three (3) inputs including a line input coupled to a line node 630, a neutral input coupled to node 601 and a ground input coupled to node 632. SENSE circuit 242 includes a current transformer (CT) 640 that includes a primary winding having a first end coupled to node 601 and a second end coupled to node 631. CT 640 additionally includes a secondary winding having a first end coupled to node 631 and a second end coupled to node 602. SENSE circuit 242 is configured to sense when a device that is interfacing with master outlet 240 is drawing current and then provides a sensing signal (SENSE SIG) to AMP circuit 244 based on the current draw. In an embodiment, the neutral input of master outlet 240 passes through the core of SENSE circuit 242 and is coupled to node 631. In some embodiments, when current is drawn by a device electrically coupled via the plug receptacle of master outlet 240, the current flows via a path that is electrically coupled to CT 640 of SENSE circuit 242 and induces a small voltage in the secondary winding of CT 640, the SENSE SIG.

In FIG. 6, AMP circuit 244 includes a first operational amplifier (Op Amp) 641 that includes a non-inverting input coupled to node 602, an inverting input coupled to node 603, an output coupled to node 604, a DC power supply input coupled to node 605 (also called Vcc) and a DC return input coupled to node 631. Resistor 642 is located between node 603 and node 604, and resistor 643 is located between node 603 and node 631. Polarized capacitor 644 includes an anode coupled to node 604 and a cathode coupled to node 607. Op Amp 645 includes a non-inverting input coupled to node 607, an inverting input coupled to node 608, an output coupled to node 609, a DC power supply input coupled to node 605 (also called Vcc) and a DC return input coupled to node 631. In one embodiment, Vcc is a fixed low power DC power signal. Resistor 646 is located between node 608 and node 609, resistor 647 is located between node 608 and node 631, and resistor 648 is located between node 607 and node 631. Diode 649 includes an anode coupled to node 609 and a cathode coupled to node 610. Polarized capacitor 650 includes an anode coupled to node 610 and a cathode coupled to node 631. Finally, diode 651 includes an anode coupled to node 610 and a cathode coupled to node 605.

AMP circuit 244 includes two operational amplifiers configured to receive a SENSE SIG from the secondary winding of CT 640 and produce a driving signal that is provided to control circuit 290. In some embodiments, AMP circuit 244 includes two (2) operational amplifiers (641 and 645) which amplify the voltage signal (SENSE SIG) to produce an amplified control signal (CTRL SIG) and provide the CTRL SIG to control circuit 290. In an example and referring to FIG. 6, SENSE SIG is amplified by the circuit of Op Amp 641, resistor 642 and resistor 643 by a factor of about 61.6 to produce and intermediate control signal. Further to this example, only the AC component of the intermediate control signal is passed by capacitor 644 and impressed across resistor 648. In this example, because there is no DC component, about half the AC signal is lost in the rail making the effective intermediate control signal voltage gain approximately 31. The intermediate control signal is then amplified by the circuit of Op Amp 645, resistor 647 and resistor 646 by a factor of approximately 29.6 with the result that the overall signal voltage gain is about 911 to produce the amplified control signal, CTRL SIG. In this example, the CTRL SIG voltage is peak-detected by the combination of capacitor 650 and diode 649.

In FIG. 6, control circuit 290 includes LED 652 including an anode coupled to node 610 and a cathode coupled to node 612; resistor 653 is located between node 612 and node 613; and resistor 654 is located between node 613 and node 631. Multi-bipolar junction transistor (BJT) circuit 655 is configured as a Darlington pair and includes a base coupled to node 613, a collector coupled to node 614 and an emitter coupled to node 631. Diode 656 includes an anode coupled to node 614 and a cathode coupled to node 615. Relay/switch 657 includes a first end coupled to node 614, a second end coupled to node 615, a stationary normally open contact coupled to node 630 and an armature moving contact coupled to node 621, which is a switch leg.

In operation, the CTRL SIG passes across both LED 652 and resistor 653 to bias BJT circuit 655 into conduction. Biasing BJT circuit 655 turns on or closes relay/switch 657, which energizes controlled outlet(s) 150. In an example, relay/switch 657 is implemented as a single pole, single throw switch. In this embodiment, diode 656 absorbs counter electromagnetic fields (EMF) from relay/switch 657; resistor 654 is used to counter Icbo from BJT circuit 655; and diode 651 discharges capacitor 650 on shutdown of power strip 600.

In FIG. 6, HI PWR circuit 270 includes capacitor 658 located between node 630 and node 617; resistor 659 is located between node 617 and node 618; and diode 662 includes an anode coupled to node 618 and a cathode coupled to node 615. Resistor 660 is located between node 630 and node 617. Zener diode 661 includes a cathode coupled to node 618 and an anode coupled to node 631, and polarized capacitor 663 includes an anode coupled to node 615 and a cathode coupled to node 631.

In operation, capacitor 658 is a reactive voltage divider, which supplies a reduced current limited voltage to resistor 659 and zener diode 661. Additionally, in this embodiment resistor 660 functions as a bleeder resistor and resistor 659 provides additional resistance in the event of over-voltages. Further to the embodiment, zener diode 661 and diode 662 are configured to provide 24 volts for a half wave rectified power signal. Additionally, in this embodiment, diode 662 is located and configured so that, during the opposite half cycle, polarized capacitor 663 is not discharged into zener diode 661, which is configured to be forward biased. Further to the embodiment, polarized capacitor 663 stores and smoothes out the energy required to run the control circuit 290. In an example, HI PWR circuit 270 supplies variable (high and low) DC power signals to control circuit 290 via node 615, and further supplies an AC power signal to relay/switch circuit 657 via node 630.

In FIG. 6, LOW PWR circuit 280 includes a polarized capacitor 664, which includes an anode coupled to node 605 and a cathode coupled to node 606. Capacitor 665 is located between node 619 and node 630, and resistor 666 is also located between node 619 and node 630. Resistor 667 is located between 619 and 620. Zener diode 668 includes a cathode coupled to node 620 and an anode coupled to node 631, and diode 669 includes an anode coupled to node 620 and a cathode coupled to node 605.

In operation, capacitor 665 is a reactive voltage divider that supplies a reduced current limited voltage to resistor 667 and zener diode 668. Additionally, in this embodiment, resistor 666 functions as a bleeder resistor, and resistor 667 provides additional resistance in the event of over-voltages. In an example, zener diode 668 and diode 669 are configured to provide 6.2 volts for a half wave rectified power signal. Additionally, in this embodiment diode 669 is located and configured so that, during the opposite half cycle, capacitor 664 is not discharged into diode 669, which is configured to be forward biased. Further to the embodiment, capacitor 664 stores and smoothes out the energy required to run the AMP circuit 244.

In the power supply portion of power strip 600, the two power circuits (HI PWR circuit 270 and LO PWR circuit 280) are substantially similar in design, but have different power values to supply to other portions of power strip 600. Utilizing a dual power supply methodology allows for a more efficient delivery of power (24V and 6.2V) to downstream active elements of power strip 600. The efficiency is realized as a single supply supplying dual voltages that are substantially different from what would be required by a resistive methodology to voltage divide the voltage down, thereby producing heat and wasting additional power.

Each of controlled outlet(s) 150 includes a plug receptacle for interfacing with a device power cord as well as three (3) inputs including a line input coupled to relay/switch 657, a neutral input coupled to node 631 and a ground input coupled to node 632. Each of constant "on" outlet(s) 130 include a plug receptacle for interfacing with a device power cord as well as three (3) inputs including a line input coupled to node 630, a neutral input coupled to node 631 and a ground input coupled to node 632.

In FIG. 6, CT 640 can be implemented as any suitable current transformer. Op Amps 641 and 645 can be implemented as any suitable operational amplifiers, such as, for example LM358 operational amplifiers available from Fairchild Semiconductor Corp of San Jose, Calif. Diodes 649, 651, 656, 662 and 669 can be implemented as any suitable diodes, such as, 1N4007 diodes available from Fairchild Semiconductor Corp of San Jose, Calif. Zener Diode 661 can be implemented as any suitable 24 volt Zener diode. Zener Diode 668 can be implemented as any suitable 6.2 volt Zener diode. LED 652 can be implemented as any suitable green LED. Relay/switch 657 can be implemented as any suitable single pole, single throw (SPST) relay. Multi-BJT circuit 655 can be implemented as any suitable multi-BJT, such as, an KSP13 BJT available from Fairchild Semiconductor Corp of San Jose, Calif. Resistors 660 and 666 can be implemented as any suitable 1 MΩ resistors. Resistors 659 and 667 can be implemented as any suitable 100Ω flame-proof resistors. Polarized capacitors 650 and 663 can be implemented as any suitable 100 µF polarized capacitors. Resistor 642 can be implemented as any suitable 20 kΩ resistor. Resistor 643 can be implemented as any suitable 330Ω resistor. Resistor 646 can be implemented as any suitable 160 kΩ resistor. Resistor 647 can be implemented as any suitable 5600Ω resistor. Resistor 648 can be implemented as any suitable 5100Ω resistor. Resistor 653 can be implemented as any suitable 1 kΩ resistor. Resistor 654 can be implemented as any suitable 3 kΩ resistor. Polarized capacitor 644 can be implemented as any suitable 1 µF polarized capacitor. Capacitor 658 can be implemented as any suitable 330 nF capacitor. Polarized capacitor 664 can be implemented as any suitable 330 µF polarized capacitor. Capacitor 665 can be implemented as any suitable 220 nF capacitor. Resister and capacitor elements can be obtained from any reputable electronic parts distributor or retailer.

Figure 7:
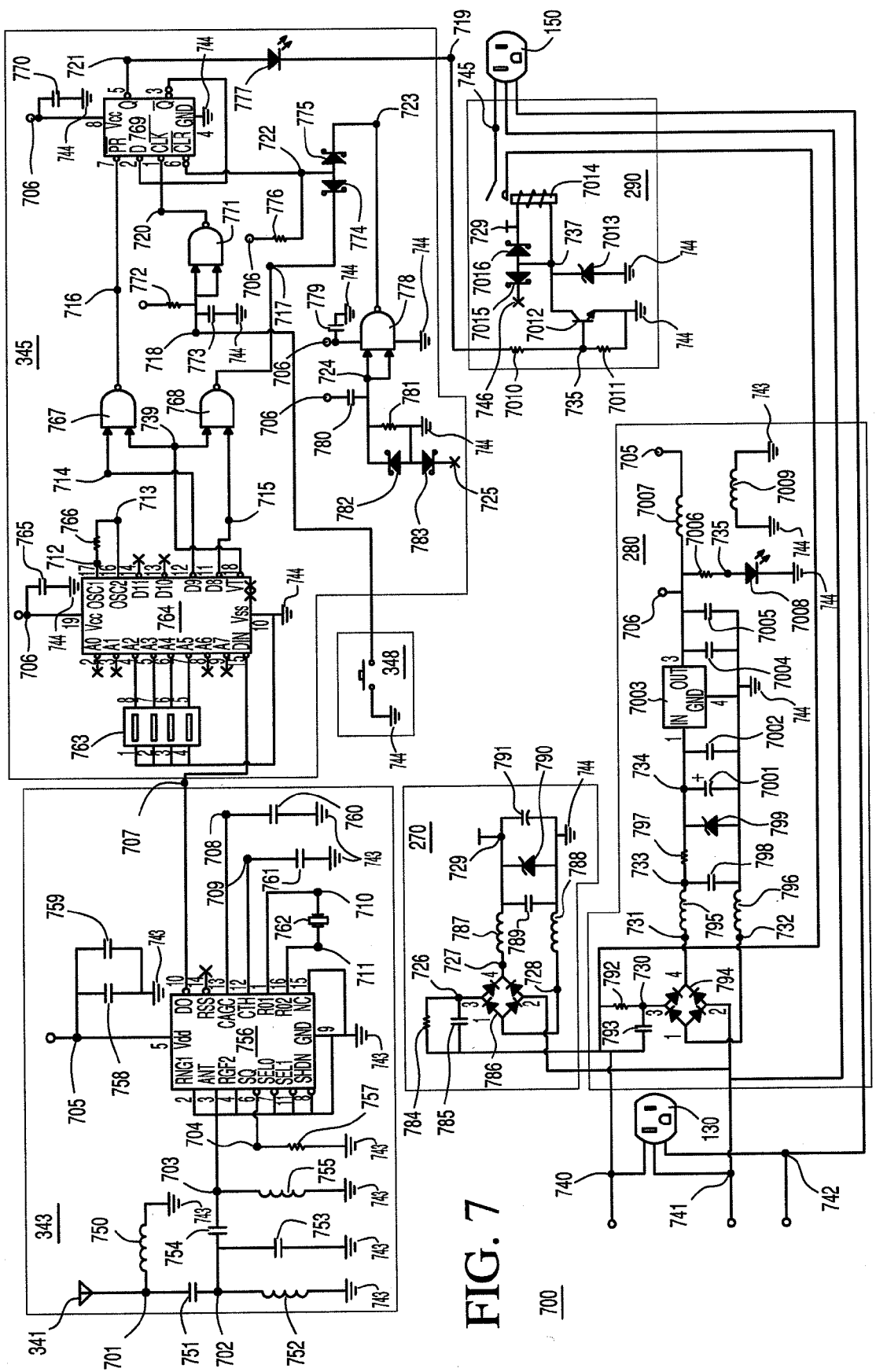
FIG. 7 is a schematic diagram illustrating an embodiment of the improved power supply of FIG. 3 that includes aspects of the subject matter described herein.

FIG. 7 is a circuit schematic diagram illustrating an embodiment of a portion of an exemplary system for providing a multi-outlet controlled power strip incorporating an improved power supply and excluding an MOV portion. The power strip 700 in FIG. 7 is a detailed view of a portion of power strip 300 of FIG. 3, but for clarity, excludes the portion of power strip 300 disclosed and described as MOV protection circuit 500 of FIG. 5. Power strip 700 performs the functionality as described in FIG. 3 by receiving protected power, such as, from an MOV protection circuit (i.e., MOV protection circuit 260 of FIG. 3) and providing multi-outlet controlled power strip functionality as also described in FIG. 3, above. Power strip 700 includes constant "on" outlet(s) 130, controlled outlet(s) 150, hi-power (HI PWR) circuit 270, low-power (LO PWR) circuit 280, control circuit 290, antenna 341, receiver circuit 343, logic circuit 345, and manual switch 348. In some embodiments, antenna 341 is configured as part of receiver circuit 343. Power strip 700 includes a line node 740, a neutral node 741 and a ground node 742 as well as numerous other nodes. Node 740 is in electrical communication with a line voltage, and in one embodiment is substantially similar to node 502 in FIG. 5. Node 741 is in electrical communication with the neutral line. Node 742 is in electrical communication with ground. Elements numbered as in FIGS. 1, 2 and/or 3 function in a substantially similarly way.

In FIG. 7, receiver circuit 343 includes an antenna 341 and receiver chip 756 as well as other elements that will be described below. Receiver circuit 343 includes antenna 341 that is coupled to node 701. Inductor 750 is located between node 701 and a radio frequency ground (RFGND) 743, and capacitor 751 is located between node 701 and node 702. Inductor 752 is located between node 702 and RFGND 743, and capacitor 753 is located between node 702 and RFGND 743. Capacitor 754 is located between node 702 and node 703, and inductor 755 is located between node 703 and RFGND 743. Receiver chip 756 includes: an antenna pin ANT coupled to node 703; a power supply pin Vdd coupled to node 705; a DO pin coupled to node 707; a CAGC pin coupled to node 708; a CTH pin coupled to node 709; a RO1 pin coupled to node 710; a RO2 pin coupled to node 711; and a RNG1 pin, a RFG2 pin, a SEL0 pin, a SEL1 pin, a SHDN pin, an NC pin and a GND pin coupled to RFGND 743. Resistor 757 is located between node 704 and RFGND 743. Capacitor 758 is located between node 705 and RFGND 743, and capacitor 759 also is located between node 705 and RFGND 743. Capacitor 760 is located between node 708 and RFGND 743, and capacitor 761 is located between node 709 and RFGND 743. Crystal 762 is located between node 710 and node 711.

In FIG. 7, logic circuit 345 includes an address selector switch 763, decoder 764, integrated circuit 769, as well as other elements. Switch 763 is an addressable selector switch and includes four (4) input pins that are coupled to GND 744 and four output pins that are coupled to pins A2-A5 of decoder 764. In other embodiments, switch 763 may be configured to include more, or less, pins with a corresponding reduction or increase in associated pins on decoder 764. Decoder 764 additionally includes: a power supply pin Vcc coupled to node 706; an OSC1 pin coupled to node 712; an OSC2 pin coupled to node 713; a D9 pin coupled to node 714; a D8 pin coupled to node 715; a VT pin coupled to node 739; and a Vss pin coupled to GND 744. Capacitor 765 is located between node 706 and GND 744. Resistor 766 is located between node 712 and node 713. Logic chips 767 is a NAND gate logic chip having a first input coupled to node 714, a second input coupled to node 739, and an output coupled to node 716. Logic chips 768 is a NAND gate logic chip having a first input coupled to node 739, a second input coupled to node 715, and an output coupled to node 717. Integrated circuit 769 includes: a Vcc pin coupled to node 706; an inverted PR pin coupled to node 716; a D pin coupled to an inverted Q pin of integrated circuit 769; a CLK pin coupled to node 720; an inverted CLR pin coupled to node 722; a Q pin coupled to node 721; and a GND pin coupled to GND 744. Capacitor 770 is coupled between node 706 and GND 744. Logic chips 771 is a NAND gate logic chip having a first input coupled to node 718, a second input also coupled to node 718, and an output coupled to node 720. Resistor 772 is located between node 718 and node 706, and capacitor 773 is located between node 718 and GND 744. Manual Switch 348 includes an output pin coupled to node 718 and a ground pin coupled to GND 744. A diode pair includes a first diode 774 having an anode coupled to node 722 and a cathode coupled to node 717, and a second diode 775 having an anode coupled to node 722 and a cathode coupled to node 723. Resistor 776 is located between node 722 and node 706. Switch power LED 777 includes an anode coupled to node 721 and a cathode coupled to node 719. Logic chip 778 is a NAND gate logic chip having a first input coupled to node 724, a second input also coupled to node 724 and an output coupled to node 723, a DC power supply input coupled to node 706 and a DC return input coupled to GND 744. Capacitor 779 is located between node 706 and GND 744. Capacitor 780 is located between node 706 and node 724, and resistor 781 is located between node 724 and GND 744. A diode pair includes a first diode 782 having a cathode coupled to node 724 and an anode coupled to GND 744 and a second diode 783 having a cathode coupled to node 725 and an anode coupled to GND 744. In one embodiment, logic chips 767, 768, 771 and 778 are implemented as NAND gates with Schmitt Triggers.

In operation, a user determines when the peripheral devices receiving power from controlled outlet(s) 150 should be enabled or disabled. The user sends an encoded signal to the unit to perform the on or off function. Antenna 341 receives the electromagnetic radiation and converts it into an electrical signal. Receiver circuit 343 selects or tunes the signal, amplifies it, and then recovers the digital signal embedded in the transmission. Receiver circuit 343 then supplies the digital signal to decoder 764 within logic circuit 345 which determines if the transmitted signal belongs to power strip 700 and the type of signal, such as, whether it is an on or an off signal. An on signal forces the flip/flop of integrated circuit 769 to output a one, and an off signal forces the flip/flop of integrated circuit 769 to output a zero. The switch 348, if pressed, changes the flip/flop to the next state. A one turns on LED 777, transistor BJT 7012, and relay circuit 7014 (elements described below); which energizes the controlled outlet(s) 150. A zero turns everything off. The power supply comprises of two modules, one to generate power for the relay and one for the rest of the circuitry. This feature is part of the energy savings scheme.

Further to the above, the received electromagnetic signal is processed through a preselect/matching filter composed of inductors 750, 752 and 755 and capacitors 751, 753 and 754. This filter matches the output impedance of antenna 341 to the input impedance of the receiver circuit 343. This process additionally helps to attenuate any out of channel signals resulting in pre-tuning the receiver. The signal is next passed into receiver chip 756 and is further tuned to a single frequency with a relatively narrow bandwidth, thus screening out most all other signals, resulting in obtaining the signal of interest. Receiver chip 756 amplifies this signal and utilizes a detection methodology to recover the embedded digital signal. Capacitors 758 and 759 remove any signals from receiver circuit 343 that could find their way in from a power supply. Crystal 762 provides a precise frequency used to run the tuning circuit. Resistor 757 is a zero ohm resistor and if removed allows the squelch feature of the radio to be used. Capacitor 761 is used in the detection circuit of receiver chip 756 and stores a relative threshold value for receiver chip 756 to determine whether to output a logic one or a logic zero signal in the serial data output. Capacitor 753 is used in the Automatic Gain Control ("AGC") circuit of the receiver. AGC is used to adjust the gain of the radio to a value fixed relative to the detector requirements for reliable output data.

The tuned signal is fed into decoder 764, which decodes this serial data into address and function. The address is checked against the value set on switch 763. If there is a match, then an on or off function is output depending on the match data, with an "on" output passing to port pin D9 of decoder 764 and an "off" output passing to port pin D8 of decoder 764. Resistor 766 sets an internal RC generated clock frequency to run the decoder 764. Capacitor 765 prevents power supply noise from leaving or entering decoder 764. Additionally, capacitor 770 and capacitor 779 perform the same function on integrated circuit 769 and logic chips 767, 768, 771 and 778, respectively.

If decoder 764 recognizes a valid address, then pin VT is set "high" for the address time, which allows the function signal to pass through a transmission gate made up of logic chips 767 and 768. If the signal is a "one," it is fed directly into the flip/flop integrated circuit 769 preset (PR bar) pin and forces a "one" resulting in an "on" signal at the Q output. The opposite signal, in this case a "zero," is fed into the D input of the flip/flop from the Q-bar output of integrated circuit 769. If a clock signal is fed into the CLK input of the flip/flop, then it will change state. Whenever a clock signal is received at the CLK input, the flip/flop will change state. The clock signal originates from logic chips 771, which is a Schmitt triggered gate. The gate receives a signal from switch 348 every time the user presses the switch button of switch 348. The switch signal from switch 348 is de-bounced by resistor 772 and capacitor 773. When the user presses the button associated with switch 348, controlled outlet(s) 150 change state. The "off" signal from the transmission gate (i.e., logic chips 767 and 768) goes through an "OR" gate composed of resistor 776 and diode-pair 774 and 775. The "off" signal passes to the CLR-bar pin of the flip/flop. Receiving the "off" signal forces LED 777, BJT 7012 and relay circuit 7014 of control circuit 290, and controlled outlet(s) 150 to switch "off". Because there is an "OR gate" logic circuit within logic circuit 345, the other signal that forces everything to the "off" state is a power on reset. This signal is generated at power "on" by logic chip (e.g., Schmitt trigger gate) 778, capacitor 780 and resistor 781. One side of diode-pair 782 and 783 quickly discharges capacitor 780 to prepare capacitor 780 to help generate another power on reset signal if required. When flip/flop circuit is "on," as defined by the Q output of integrated circuit (IC) 769 is a "one" or "high," then current flows through the LED 777 causing it to light up and indicate that the controlled outlet(s) 150 are "on."

In FIG. 7, HI PWR circuit 270 includes a resistor 784 located between node 740 and node 726, and a capacitor 785 located between node 740 and node 726. Full-wave bridge rectifier 786 includes a pin1 coupled to node 728, a pin2 coupled to node 741, pin3 coupled to node 726, and pin4 coupled to node 727. Inductor 787 is located between node 727 and node 729. Inductor 788 is located between node 728 and node GND 744. Capacitor 789 is located between node 729 and GND 744, Zener diode 790 includes an anode coupled to GND 744 and a cathode coupled to node 729, and polarized capacitor 791 includes an anode couple to node 729 and a cathode coupled to GND 744.

In FIG. 7, LO PWR circuit 280 includes a resistor 792 located between node 730 and 740, and capacitor 793 is located between node 730 and 740. Full-wave bridge rectifier 794 includes a pin1 coupled to node 732, a pin2 coupled to node 741, pin3 coupled to node 730, and pin4 coupled to node 731. Inductor 795 is located between node 731 and node 733, and inductor 796 is located between node 732 and GND 744. Resistor 797 is located between node 733 and node 734, and capacitor 798 is located between node 733 and GND 744. Zener diode 799 includes an anode coupled to GND 744 and a cathode coupled to node 734; polarized capacitor 7001 includes an anode couple to node 734 and a cathode coupled to GND 744; and capacitor 7002 is located between node 734 and GND 744. Low drop-out (LDO) regulator 7003 includes an input pin coupled to node 734, an output pin coupled to node 706, and a ground pin coupled to GND 744. Capacitor 7004 is located between node 706 and GND 744, and capacitor 7005 is located between node 706 and GND 744. Resistor 7006 is located between node 706 and node 735. Inductor 7007 is located between node 706 and node 705. LED 7008 includes an anode coupled to node 735 and a cathode coupled to GND 744. Inductor 7009 is located between RFGND 743 and GND 744.

Because HI PWR circuit 270 and LO PWR circuit 280 are similar but with different values to supply power as required, only one will be described in detail, as the other is functionally the same. Capacitor 793 of LO PWR circuit 280 is a reactive voltage divider which supplies a reduced voltage that is current limited to resistor 797 and LDO regulator 7003. Resistor 792 is a bleeder resistor. Capacitor 798, inductors 795 and 796, resistor 797 and Zener diode 799 provide protection in the event of over voltages. Full-wave bridge rectifier 794 converts the incoming AC power to DC. Capacitors 7001 and 7002 further protect against surge voltages, help smooth the incoming rectified voltage and provide a broad band low impedance source for LDO regulator 7003. LDO regulator 7003 is an active low drop out regulator which provides a fixed voltage output for receiver circuit 343 and logic circuit 345. Capacitors 7004 and 7005 further smooth the output voltage and provide a required pole for LDO regulator 7003. Inductors 7007 and 7009 isolate noise generated in the logic circuit from the radio. Resistor 7006 and LED 7008 are not used to generate power, but are an indicator circuit providing an indicator light when two conditions are both met. The two conditions are: (1) that constant "on" outlet(s) 130 have power; and (2) the main MOVs of MOV protection circuit 500 in FIG. 5 have not failed.

Utilizing HI PWR circuit 270 and LO PWR circuit 280 as a two section power supply design reduces power consumption of the power supply. In operation and understanding that power is a function of voltage times current, if a circuit will operate at some fixed current level, but at various voltages, then choosing the lowest voltage will use the least amount of power. Therefore, the low voltage supply (i.e., LO PWR circuit 280) is used to generate low voltage power for the radio and logic circuitry. This configuration uses the minimal amount of power for the low voltage circuitry because the reactive input power supply wastes no real power to generate the low voltage from the high voltage AC line power. The voltage for the relay is the high voltage supply (i.e., HI PWR circuit 270). Like the low voltage supply, the high voltage supply uses a reactive input to drop the line voltage to the voltage required for the relay. The high voltage supply is also a "soft" supply. That is, the voltage drops while a load current is drawn from the supply, providing even more of a power savings. The uniqueness of this approach as compared to the more traditional single power supply approach is that a power savings as high as 4 to 1 can be achieved over the traditional method.

In FIG. 7, control circuit 290 includes resistor 7010 that is located between node 719 and node 735, and resistor 7011 is located between node 735 and GND 744. Bipolar transistor BJT 7012 includes a base coupled to node 735, a collector coupled to node 737, and an emitter coupled to GND 744. Zener diode 7013 includes a cathode coupled to node 737 and an anode coupled to GND 744. Relay circuit 7014 includes a first end coupled to node 737, a second end coupled to node 729, a stationary normally open contact coupled to node 740 and an armature moving contact coupled to node 745, which is a switch leg. A diode pair includes a first diode 7015 having a cathode coupled to node 746 and an anode coupled to node 737 and a second diode 7016 having a cathode coupled to node 729 and an anode also coupled to node 737.

In operation, current flows from logic circuit 345 to control circuit 290 through resistor 7010, which limits the current for both LED 777 and the base of BJT 7012. When current flow through resistor 7010, BJT 7012 turns "on" and allows current to flow in the coil of relay circuit 7014 of control circuit 290 causing relay circuit 7014 to close its contacts and supply power to the controlled outlet(s) 150. If the flip/flop circuit of logic circuit 345 is "off," as defined by the Q output of integrated circuit 769 is zero or "low," then the LED 777 is not forward biased, and BJT 7012, relay circuit 7014, and controlled outlet(s) 150 are "off". When controlled outlet(s) 150 are "off," there is no current flow into the base of BJT 7012 other than Icbo. Because the Icbo leakage current could turn the transistor on, resistor 7011 drains any BJT 7012 Icbo to a safe level thereby preventing BJT 7012 from turning "on." Only one half of the diode-pair including diodes 7015 and 7016 (7016 across the relay coil) is used for counter EMF when BJT 7012 turns off. Zener diode 7013 is used to protect BJT 7012 against surge voltage from the AC line that pass through the power supply.

Figure 8:
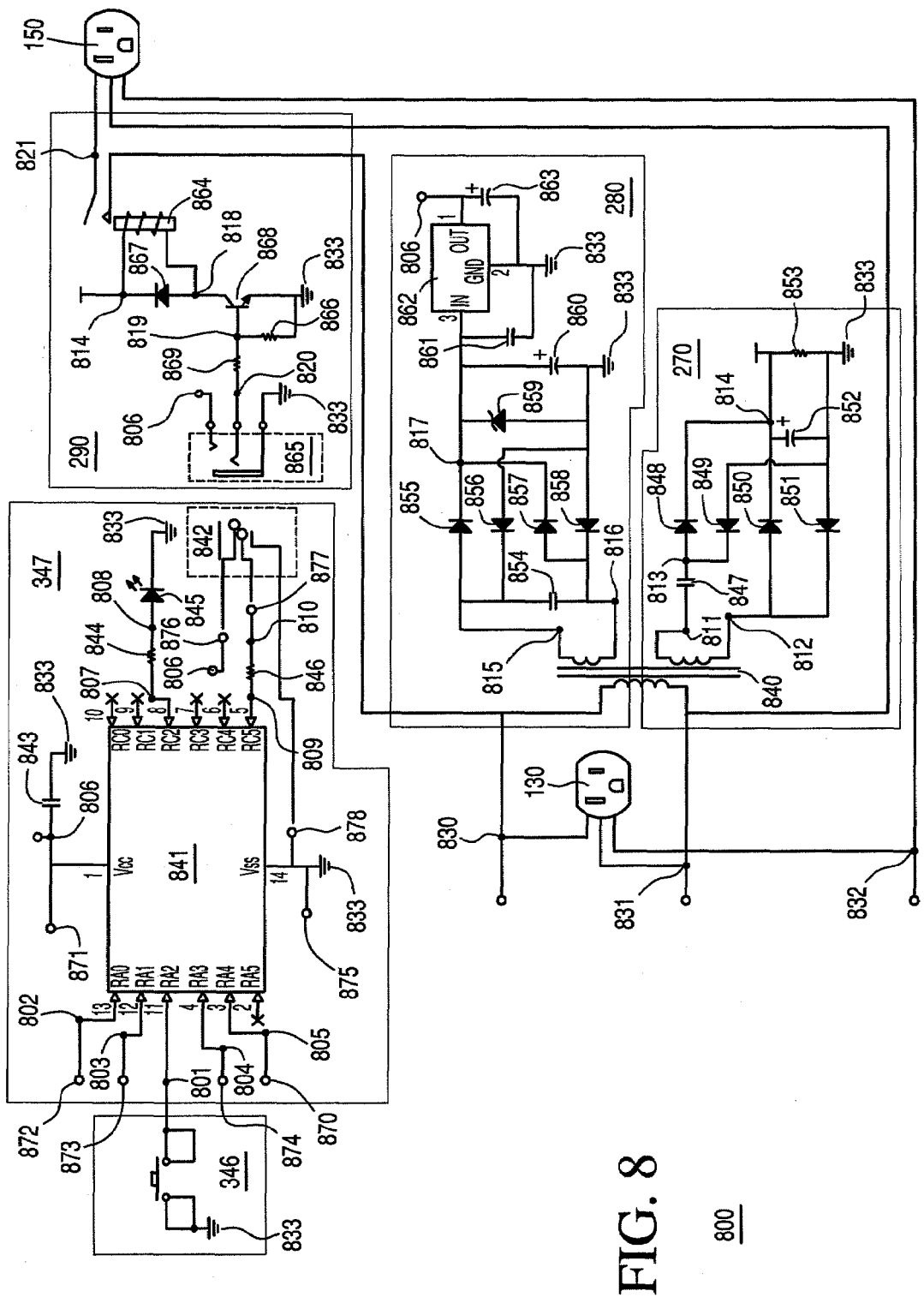
FIG. 8 is a schematic diagram illustrating an embodiment of the improved power supply of FIG. 4 that includes aspects of the subject matter described herein.

In FIG. 7, receiver chip 756 can be implemented as any suitable receiver chip, such as, for example a MICRF211 available from Micrel Inc of San Jose, Calif. Crystal 762 can be implemented as any suitable crystal device having a frequency of 13.52127 MHz. Address selector switch 763 can be implemented as any suitable 4 position DIP address selector switch. Decoder 764 can be implemented as any suitable logic chip, such as, for example a HT12D available from Holtek Semiconductor Inc. of Fremont, Calif. NAND gate logic chips 767, 768, 771 and 778 can be implemented as any suitable NAND gate logic chips, such as, for example a MM74HC132 available from Fairchild Semiconductor Corp of San Jose, Calif. Integrated circuit 769 can be implemented as any suitable logic chip, such as, for example a NC7SZ74 available from Fairchild Semiconductor Corp of San Jose, Calif. LDO regulator 7003 can be implemented as any suitable LDO regulator, such as, for example a LP2950ACDT-3.3 available from ON Semiconductor of Phoenix, Ariz. BJT 7012 can be implemented as any suitable BJT. Relay circuit 7014 can be implemented as any suitable single pole, single throw (SPST) relay. Diode—pairs 774 and 775, 782 and 783, and 7015 and 7016 can be implemented as any suitable diode—pair device, such as, for example a BAS40SL available from Fairchild Semiconductor Corp of San Jose, Calif. Full-wave bridge rectifiers 786 and 794 can be implemented as any suitable full-wave bridge rectifier, such as, for example a S1ZB60 available from Shindengen America, Inc of Bannockburn, Ill. LEDs 777 and 7008 can be implemented as any suitable green LEDs. Zener Diode 790 can be implemented as any suitable 24 volt Zener diode. Zener Diode 799 can be implemented as any suitable 4.7 volt Zener diode. Zener Diode 7013 can be implemented as any suitable 27 volt Zener diode. Inductors 787, 788, 795, 796, 7007, and 7009 are inductors having 1 kΩ at 100. Inductor 750 can be implemented as any suitable 30 nH inductor. Inductor 752 can be implemented as any suitable 24 nH inductor. Inductor 755 can be implemented as any suitable 39 nH inductor. Capacitors 758, 761, 765, 770, 779, 789, 798, 7002, and 7004 can be implemented as any suitable 0.1 µF capacitors. Capacitors 759, 760 and 7005 can be implemented as any suitable 4.7 µF capacitors. Capacitors 773 and 780 can be implemented as any suitable 0.22 µF capacitors. Capacitor 751 can be implemented as any suitable 1.2 pF capacitor. Capacitor 753 can be implemented as any suitable 5.6 pF capacitor. Capacitor 785 can be implemented as any suitable 0.15 µF capacitor. Capacitor 793 can be implemented as any suitable 0.27 µF. Polarized capacitors 791 and 7001 can be implemented as any suitable 100 µF at 50 volts polarized capacitors. Resistors 784 and 792 can be implemented as any suitable 470 kΩ resistors. Resistor 766 can be implemented as any suitable 32.4 kΩ resistor. Resistor 772 can be implemented as any suitable 22.1 kΩ resistor. Resistor 776 can be implemented as any suitable 20.0 kΩ resistor. Resistor 781 can be implemented as any suitable 200 kΩ resistor. Resistor 797 can be implemented as any suitable 510Ω resistor. Resistor 7006 can be implemented as any suitable 3010Ω resistor. Resistor 7010 can be implemented as any suitable 1630Ω resistor. Resistor 7011 can be implemented as any suitable 100 kΩ resistor. Resister and capacitor elements can be obtained from any reputable electronic parts distributor or retailer FIG. 8 is a circuit schematic diagram illustrating an embodiment of a portion of an exemplary system for providing a multi-outlet controlled power strip incorporating an improved power supply and excluding an MOV portion. The power strip 800 in FIG. 8 is a detailed view of a portion of power strip 400 of FIG. 4 but for clarity, excludes the portion of power strip 400 disclosed and described as MOV protection circuit 500 of FIG. 5. Power strip 800 performs the functionality as described in FIG. 4 by receiving protected power, such as, from an MOV protection circuit (i.e., MOV protection circuit 260 of FIG. 3) and providing multi-outlet controlled power strip functionality as also described in FIG. 4, above. Power strip 800 includes constant "on" outlet(s) 130, controlled outlet(s) 150, hi-power (HI PWR) circuit 270, low-power (LO PWR) circuit 280, control circuit 290, stimuli circuit 346, logic circuit 347, and transformer 840. Power strip 800 includes a line node 830, a neutral node 831, and a ground node 832. Node 830 is in electrical communication with a line voltage, and in one embodiment is substantially similar to node 502 in FIG. 5. Node 831 is in electrical communication with the neutral line. Node 832 is in electrical communication with ground. Elements numbered as in FIGS. 1, 2 and/or 4 function in a substantially similarly way. Transformer 840 includes a primary winding, a low-power secondary winding in electromagnetic communication with the primary winding and a hi-power secondary winding in electromagnetic communication with the primary winding. The primary winding of transformer 840 includes a first tap that is in electrical communication with node 830, and a second tap that is in electrical communication with node 831. Transformer includes additional elements that will be described further below. Additionally, stimuli circuit 346 is configured as a manual switch input circuit. In some embodiments, stimuli circuit 346 can be configured as any number of different stimuli circuits, such as, for example as a motion sensor circuit, a thermal sensor circuit, an ultrasonic sensor, and the like. FIG. 8 illustrates a line isolated power supply that may be utilized for safety concerns when part(s) of a circuit are accessible to the user.

In operation, a user and/or the device, depending on the input stimulus, determines when the peripheral devices should be supplied with power. In some embodiments the user presses a button to switch on the switched outlets and start a timer which then ends the sequence. In other embodiments, other input stimuli may completely automate the process, or the process may be completely manual, or some combination thereof. In one embodiment, power strip 800 operates as follows: a press of a switch sends an instruction signal to a microcontroller to turn on an LED and the circuitry associated with activating a relay, which energizes the controlled outlets; after a fixed time, the LED will start to blink on and off, if the button is not activated in the next short time window, the microcontroller turns the controlled outlets "off;" and if the button is pressed, the LED stays "on," the relay remains "on" and the timer resets and restarts. In other embodiments, depending on the stimulus and the programming, different or all portions of the sequence may be automated. As with previous embodiments the power supply consists of two modules, one to generate power for the relay and one for the rest of the circuitry, and again this feature is part of the energy savings scheme.

In FIG. 8, logic circuit 347 includes a logic chip 841 and an electrical plug 842, as well as other elements that will be described below. In some embodiments, electrical plug 842 allows for the logic circuit 347 portion of power strip 800 to be removed from the circuit, if necessary. Logic chip 841 includes: an RA0 pin coupled to node 802; a RA1 pin coupled to node 803, a RA2 pin coupled to node 801, a RA3 pin coupled to node 804, a RA4 pin coupled to node 805, a power supply pin Vcc coupled to node 806, a RC2 pin coupled to node 807, a RC5 pin coupled to node 809, and a Vss pin coupled to GND 833. Test pin 870 is coupled to node 805; programming pad 871 is coupled to node 806; programming pad 872 is coupled to node 802; programming pad 873 is coupled to node 803; programming pad 874 is coupled to node 804; and programming pad 875 is coupled to node GND 833. In some embodiments, pins RA0-RA3 are configured as programming pins, and pin RA4 is configured to provide clock information, such as, for example for programming support. Capacitor 843 is located between node 806 and GND 833. Resistor 844 is located between node 807 and node 808. LED 845 includes an anode coupled to node 808 and a cathode coupled to GND 833. Resistor 846 is located between node 809 and node 810. Electrical plug 842 includes a first pin coupled to node 806, a second pin coupled to node 810 and a third pin coupled to GND 833. In operation, each of the pins of electrical plug 842 mechanically and electrically coupled to a corresponding female connector located within jack 865 of control circuit 290.

In operation, logic chip 841 is implemented as a microcontroller that is programmed for the sequence through signals applied at programming pads 871-875. A timing test signal can be measured at test pin 870 when test code is invoked. Capacitor 843 is used to help isolate digital noise from the power supply. At the start of the fixed time period described above, current flows through resistor 844 to LED 845 and the LED illuminates. Resistor 844 limits the current. In one embodiment, logic circuit 347 is a separate module from the outlet strip and is electrically connected through electrical plug 842 of logic circuit 347 and jack 865 of control circuit 290. In one embodiment, electrical plug 842 is implemented as a 3.5 millimeter (mm) stereo phone plug, and jack 865 is implemented as a mating jack on power strip 800. In some embodiments, portions of electrical plug 842 are soldered to pads 876-878. In operation, electrical plug 842 carries a signal used to power circuitry that activates controlled outlet(s)

150 and additionally provides power for logic chip 841, stimuli circuit 346, and LED 845. Further to the example, at the start of the timing sequence and at the same time logic chip 841 supplies current to LED 845, logic chip 841 additionally supplies current to resistor 846. Resistor 846 is in series with a signal wire in electrical plug 842 and passes power to resistor 869, and hence, to control circuit 290.

In FIG. 8, HI PWR circuit 270 includes the hi-power secondary winding portion of transformer 840 that includes a first tap coupled to node 811, and a second tap coupled to node 812. Capacitor 847 is located between node 811 and node 813. Diode 848 includes an anode that is coupled to node 813 and a cathode that is coupled to node 814. Diode 849 includes a cathode that is coupled to node 813 and an anode that is coupled to GND 833. Diode 850 includes an anode that is coupled to node 812 and a cathode that is coupled to node 814. Diode 851 includes a cathode that is coupled to node 812 and an anode that is coupled to GND 833. Polarized capacitor 852 includes an anode that is coupled to node 814 and a cathode that is coupled to GND 833. Resistor 853 is located between node 814 and GND 833.

In FIG. 8, LO PWR circuit 280 includes the low-power secondary winding portion of transformer 840 that includes a first tap coupled to node 815, and a second tap coupled to node 816. Capacitor 854 is located between node 815 and node 816. Diode 855 includes an anode that is coupled to node 815 and a cathode that is coupled to node 817. Diode 856 includes a cathode that is coupled to node 815 and an anode that is coupled to GND 833. Diode 857 includes an anode that is coupled to node 816 and a cathode that is coupled to node 817. Diode 858 includes a cathode that is coupled to node 816 and an anode that is coupled to GND 833. Zener diode 859 includes a cathode that is coupled to node 817 and an anode that is coupled to GND 833. Polarized capacitor 860 includes an anode that is coupled to node 817 and a cathode that is coupled to GND 833. Capacitor 861 is located between node 817 and GND 833. Low drop-out (LDO) regulator 862 includes an input pin coupled to node 817, an output pin coupled to node 806, and a ground pin coupled to GND 833. Polarized capacitor 863 includes an anode that is coupled to node 806 and a cathode that is coupled to GND 833.

In FIG. 8, power for power strip 800 is supplied from transformer 840. The input of transformer 840 protects the user from electric shock in the event contact is made between the user and exposed metal connected to the circuit. Transformer 840 has two secondary windings that are similar, but have different voltage values for supplying different levels of power, as required. For both power values supplied, transformer 840 efficiently reduces the input voltage on the primary winding of transformer 840 to some usable value. For the high voltage supply, capacitor 847 is a reactive current limiter to the full-wave rectifier diode bridge 848, 849, 850, and 851. Polarized capacitor 852 stores and smoothes the voltage supplied to the relay circuit 864. Resistor 853 bleeds excess energy from polarized capacitor 852.

The low voltage supply uses diodes 855, 856, 857 and 858 as the full wave rectifier bridge. The input to the bridge is shunted by capacitor 854, and the output of the bridge is shunted by zener diode 859. Both of these components are used to help attenuate any voltage surges. Capacitors 860 and 861 also help to mitigate surge damage. Capacitors 860 and 861 have other functions. Capacitors 860 and 861 help smooth the incoming rectified voltage and provide a broad band low impedance source for regulator 862. Regulator 862 is an active low drop out regulator, which provides a fixed voltage output for the micro controller and related circuitry. Polarized capacitor 863 helps to further smooth the output voltage and provides a required pole for the regulator.

In FIG. 8, control circuit 290 includes relay circuit 864, jack 865, as well as other elements that will be described below. Relay circuit 864 includes a first end coupled to node 814, a second end coupled to node 818, a stationary normally open contact coupled to node 830 and an armature moving contact coupled to node 821, which is a switch leg. Diode 867 includes a cathode that is coupled to node 814 and an anode that is coupled to node 818. Bipolar transistor BJT 868 includes a collector coupled to node 818, a base coupled to node 819 and an emitter coupled to GND 833. Resistor 866 is located between node 819 and GND 833, and resistor 869 is located between node 819 and node 820. Jack 865 includes a first pin coupled to GND 833, a second pin coupled to node 806 and a third pin coupled to node 820. In operation, each of the female connectors of jack 865 mechanically and electrically receive a corresponding male connector located at electrical plug 842 of logic circuit 347.

In operation, electrical plug 842 of logic circuit 347 passes power to resistor 869 of control circuit 290 via jack 865. Because resistor 869 is in series with the base of a BJT 868, when the power is passed to resistor 869, BJT 868 turns "on" which turns relay circuit 864 "on." Relay circuit 864 then energizes the controlled outlet(s) 150. Resistors 846 and 869 limit the current to the base of BJT 868. Resistor 846 also helps to protect logic chip 841 from electrostatic discharge (ESD). Diode 867 is used to absorb the counter EMF generated by the magnetic field collapse from relay circuit 864 when BJT 868 turns "off." Resistor 866 is used to defeat the effect of Icbo if the logic circuit 347 is not electrically coupled to control circuit 290 via jack 865.

In FIG. 8, utilizing a two-tiered power supply design reduces power consumption within power strip 800. The reduced power consumption occurs as power is a function of voltage times current and if a circuit will operate at some fixed current level but at various voltages, then utilizing the lowest voltage will result in the least amount of power consumption. Therefore, a low voltage supply is used to generate low voltage power for logic chip 841 and associated circuitry. This technique uses the minimal amount of power for the low voltage circuitry because the transformer input power supply wastes little power to generate the low voltage from the high voltage AC line power. The voltage for relay circuit 864 is the high voltage supply. Like the low voltage supply, the high voltage supply uses a transformer input to drop the line voltage to the voltage required for the relay circuit 864. Unlike the low voltage supply, there is also a reactive current limiter, which wastes no real power. This is called a "soft" supply. The reactive current limiter takes advantage of an effect of relay circuit 864. In other words, as load current is drawn from the supply, the voltage drops, providing even more of a power savings. Additionally, although relay circuit 864 requires a high voltage to initially close its contacts and energize controlled outlet(s) 150 and uses the energy stored in capacitor 852 for initial engagement, relay circuit 864 can remain closed during operation using a lower voltage and therefore using less power. The uniqueness of this approach is that a power savings can be achieved over traditional methods.

In FIG. 8, transformer 840 can be implemented as any suitable transformer having a single pole and two secondary windings. Logic chip 841 can be implemented as any suitable logic chip or microcontroller, such as, for example a PIC16F616-I/SL available from Microchip Technology, Inc. of Chandler, Ariz. Electrical plug 842 can be implemented as any suitable electric plug. Relay 864 can be implemented as any suitable single pole, single throw (SPST) relay. LDO regulator 862 can be implemented as any suitable LDO regulator, such as, for example a LP2950ACDT-3.3 available from ON Semiconductor of Phoenix, Ariz. Electrical jack 865 can be implemented as any suitable electric jack. BJT 868 can be implemented as any suitable BJTA. Diodes 848-851 and 855-858 can be implemented as any suitable diodes, such as, for example an 1N4007 diode available from Fairchild Semiconductor Corp of San Jose, Calif. Diode 867 can be implemented as any suitable diode, such as, for example an 1N4148 available from Fairchild Semiconductor Corp of San Jose, Calif. Zener Diode 859 can be implemented as any suitable 15 volt 0.5 watt Zener diode, such as, an 1N5245B Zener diode available from Fairchild Semiconductor Corp of San Jose, Calif. LED 845 can be implemented as any suitable green LED. Capacitors 843, 854 and 861 can be implemented as any suitable 100 nF capacitors. Capacitor 847 can be implemented as any suitable 1 µF at 50 volts capacitor. Polarized capacitor 852 can be implemented as any suitable 100 µF polarized capacitor. Polarized capacitor 860 can be implemented as any suitable 100 µF at 16 volts polarized capacitor. Polarized capacitor 863 can be implemented as any suitable 10 µF at 16 volts polarized capacitor. Resistor 844 can be implemented as any suitable 1 kΩ resistor. Resistor 846 can be implemented as any suitable 2 kΩ resistor. Resistor 853 can be implemented as any suitable 3.9 MΩ resistor. Resistor 866 can be implemented as any suitable 100 kΩ resistor. Resistor 869 can be implemented as any suitable 3 kΩ resistor. Resister elements can be obtained from any reputable electronic parts distributor or retailer.

Figure 9:
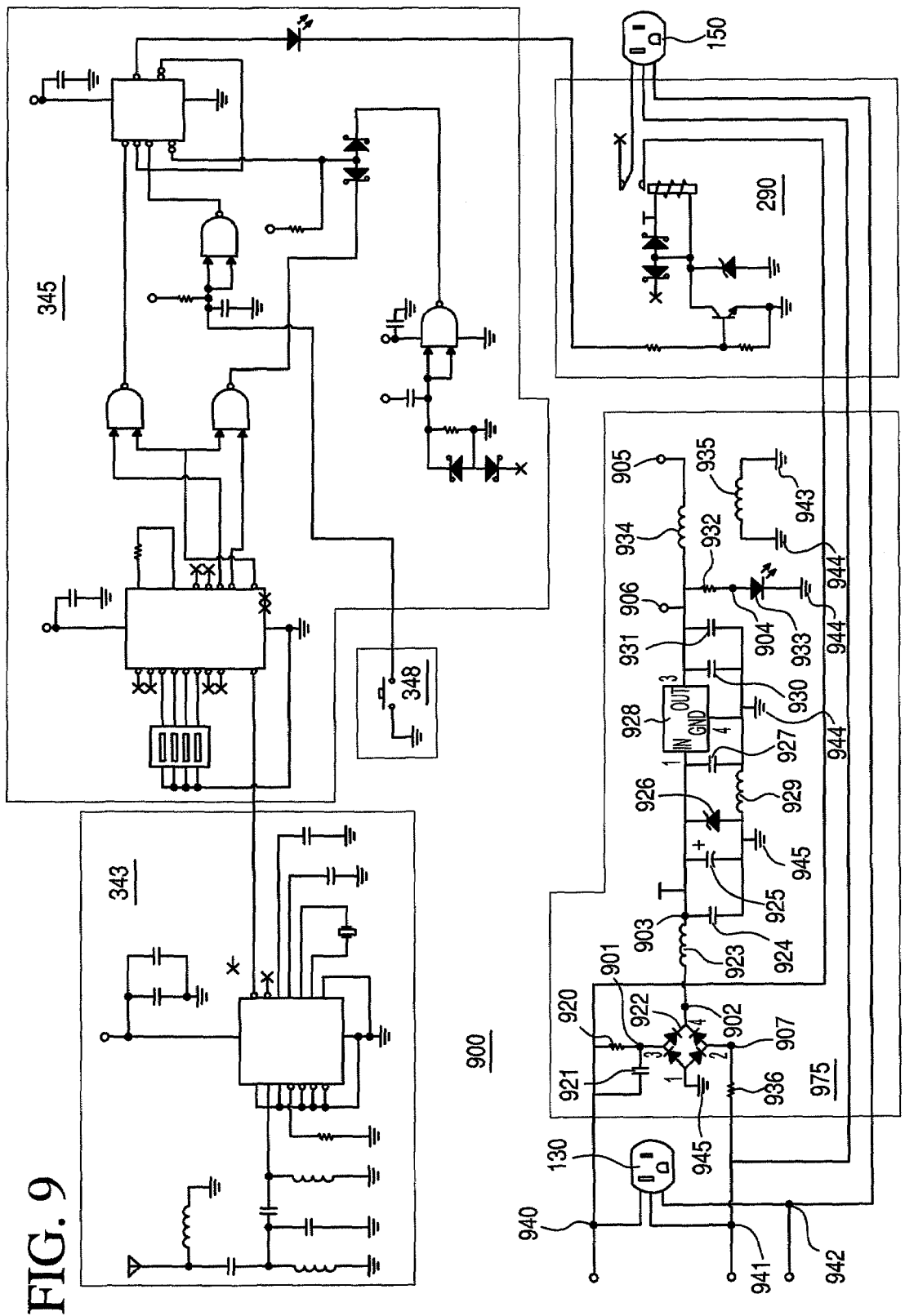
FIG. 9 is a schematic diagram illustrating another embodiment of the improved power supply of FIG. 2 that includes aspects of the subject matter described herein.

FIG. 9 is a circuit schematic diagram illustrating an embodiment of a portion of an exemplary system for providing a multi-outlet controlled power strip incorporating an improved power supply and excluding an MOV portion. The power strip 900 in FIG. 9 is another embodiment of a portion of power strip 300 of FIG. 3. Portions of power strip 900 are substantially similar to portions of power strip 700 of FIG. 7, function in substantially similar ways and their elements will not be described further. The power strip 900 in FIG. 9 is a detailed view of another embodiment of power strip 300 of FIG. 3 and includes a single improved power supply but, for clarity, excludes the portion of power strip 300 disclosed and described as MOV protection circuit 500 of FIG. 5. Power strip 900 performs the functionality as described in FIG. 3 by receiving protected power, such as, from an MOV protection circuit (i.e., MOV protection circuit 260 of FIG. 3) and providing multi-outlet controlled power strip functionality. Power strip 900 include constant "on" outlet(s) 130, controlled outlet(s) 150, power supply circuit 975, control circuit 290, receiver circuit 343, logic circuit 345, and manual switch 348. Power strip 900 includes a line node 940, a neutral node 941 and a ground node 942 as well as numerous other nodes. Node 940 is in electrical communication with a line voltage, and in one embodiment is substantially similar to node 502 in FIG. 5. Node 941 is in electrical communication with the neutral line. Node 942 is in electrical communication with ground. Elements numbered as in FIGS. 1, 2, 3 and/or 7 function in a substantially similarly way.

In operation, a user determines when the peripheral devices should have power. The user sends an encoded signal to the unit to perform the power "on" or "off" function. Receiver circuit 343 receives the signal, tunes, amplifies and converts it into an electrical signal that is passed to logic circuit 345 for implementation. As described in FIG. 7 above, logic circuit 345 switches controlled outlet(s) 150 "on" or "off". Manual switch 348 also switches the controlled outlet(s) 150 "on" or "off". The power supply is a single module, which generates power for both relay circuit 7014 of control circuit 290 and the low voltage circuitry of power supply circuit 975, described below.

In FIG. 9, power supply circuit 975 includes a resistor 920 located between node 901 and 940, and capacitor 921 located between node 901 and 940. Full-wave bridge rectifier 922 includes a pin1 coupled to relay ground node (RLYGND) 945, pin2 coupled to node 907, pin3 coupled to node 901, and pin4 coupled to node 902. Resistor 936 is located between node 907 and node 941. Inductor 923 is located between node 902 and node 903. Capacitor 924 is located between node 903 and RLYGND 945. Polarized capacitor 925 includes an anode coupled to node 903 and a cathode coupled to RLYGND 945, and Zener diode 926 includes an anode coupled to RLYGND 945 and a cathode coupled to node 903. Inductor 929 is located between RLYGND 945 and GND 944. Capacitor 927 is located between node 903 and GND 944. Low drop-out (LDO) regulator 928 includes an input pin coupled to node 903, an output pin coupled to node 906, and a ground pin coupled to GND 944. Capacitor 930 is located between node 906 and GND 944, and capacitor 931 is located between node 906 and GND 944. Resistor 932 is located between node 906 and node 904, and LED 933 includes an anode coupled to node 904 and a cathode coupled to GND 944. Inductor 934 is located between node 906 and node 905. Inductor 935 is located between RFGND 943 and GND 944.

In FIG. 9, Resistor 932 and LED 933 are not used to generate power, but are an indicator circuit providing an indicator light when two conditions are both met. The two conditions are: (1) that constant "on" outlet(s) 130 have power; and (2) the main MOVs of MOV protection circuit 500 in FIG. 5 have not failed. Capacitor 921 is a reactive voltage divider which supplies a reduced voltage that is current limited to the full-wave bridge rectifier 922. Resistor 920 is a bleeder resistor for capacitor 921. Resistor 936 is a fuse in the event that capacitor 921 shorted. Resistor 936 is shown as a zero ohm resistor, but in other embodiments Resistor 936 can be, for example, a 100 ohms and 1 watt flameproof resistor. Full-wave bridge rectifier 922 converts incoming AC power to DC power. Capacitors 924 and 925, inductor 923 and Zener diode 926 act to attenuate surge over-voltages. Capacitor 925 smoothes the rectified voltage from the bridge and stores the energy for use by relay circuit 7014 of control circuit 290. Zener diode 926 has a second function in which it establishes the maximum voltage across capacitor 925. Capacitor 927 and inductor 929 protect against surge voltages. Capacitor 927 also provides a high-frequency, low-impedance source for LDO regulator 928 allowing LDO regulator 928 to respond to fast changing loads. LDO regulator 928 is an active LDO regulator that provides a fixed voltage output for the receiver circuit 343 and logic circuit 345. Capacitors 930 and 931 help to further smooth the output voltage and provide a required pole for LDO regulator 928. Inductors 934 and 935 isolate noise generated in the logic circuit from the radio.

In FIG. 9, Zener diode 926 generates the 24 volts needed to initially close relay circuit 7014 of control circuit 290. This voltage is too high for the rest of the circuitry and is regulated down to 3.3 volts by LDO regulator 928. Unfortunately, the process of regulating the voltage down from 24 volts to 3.3 volts is inefficient and consumes real power in the LDO regulator 928 and in Zener diode 926. To counteract this problem, the value of capacitor 921 keeps the inefficient power consumption at a minimum. When relay circuit 7014 of control circuit 290 is engaged, the voltage across Zener diode 926 reduces to approximately 7.6 volts and there is little to no power wastage in Zener diode 926 as well as reduced power wastage within LDO regulator 928. This embodiment, while not saving as much power as the dual power supplies previously described, still saves power both in the design function and in the design itself.

In FIG. 9, LDO regulator 928 can be implemented as any suitable LDO regulator, such as, for example a LP2950ACDT-3.3 available from ON Semiconductor of Phoenix, Ariz. Full-wave bridge rectifier 922 can be implemented as any suitable full-wave bridge rectifier, such as, for example a S1ZB60 available from Shindengen America, Inc of Bannockburn, Ill. Zener Diode 926 can be implemented as any suitable 24 volt Zener diode. LED 933 can be implemented as any suitable green LED. Inductors 923, 929, 934 and 935 are inductors having 1 kΩ at 100. Capacitors 924, 927 and 930 can be implemented as any suitable 0.1 μF capacitors. Capacitor 921 can be implemented as any suitable 0.47 μF capacitor. Polarized capacitor 925 can be implemented as any suitable 100 μF at 50 volts polarized capacitor. Capacitor 931 can be implemented as any suitable 4.7 μF capacitor. Resistor 920 can be implemented as any suitable 470 kΩ resistor. Resistor 932 can be implemented as any suitable 332 kΩ resistor. Resister and capacitor elements can be obtained from any reputable electronic parts distributor or retailer.

Figure 10:
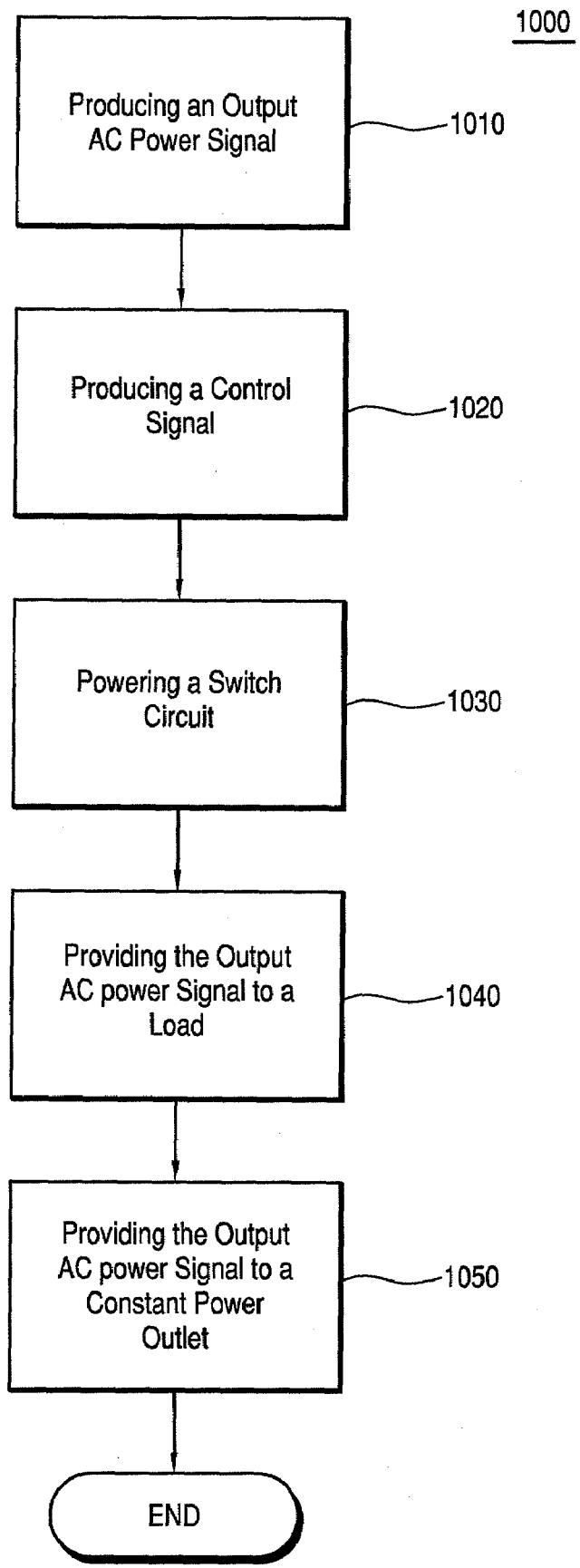
FIG. 10 is a block diagram illustrating a method for providing improved power that includes aspects of the subject matter described herein.

FIG. 10 illustrates an example of a method 1000 of providing a selectable output AC power signal, according to an embodiment of the present invention. Method 1000 includes a process 1010 of producing an output AC power signal, a first DC power signal, and a second DC power signal at a power supply and based on a received input AC power signal. As an example, method 1000 can be a method associated with power strip 200 in FIG. 2, power strip 300 in FIG. 3, and/or power strip 400 in FIG. 4. In this example, the output AC power signal of process 1010 can be similar to the output AC power signal for constant "on" outlet(s) 130, controlled outlet(s) 150, and/or master outlet(s) 240. in this same example, the first DC power signal of process 1010 can be similar to the output of HI PWR circuit 270, and the second DC power signal of process 1010 can be similar to the output of LO PWR circuit 280. Also, the received input AC power signal of process 1010 can be similar to the input for power plug 120.

Next, method 1000 includes a process 1020 of producing a control signal at a control circuit based on a received command signal and the second DC power signal. As an example, the control signal of process 1020 can be similar to the signal transmitted from command input device 140 to control circuit 290 (FIGS. 2-4). In this same example, the command signal of process 1020 can be similar to the command signal generated within and transmitted within command input device 140 (FIGS. 2-4).

Subsequently, method 1000 includes a process 1030 of powering a switch circuit with the first DC power signal based on the control signal and the second DC power signal. As an example, the switch circuit of process 1030 can be a portion of control circuit 290 (FIGS. 2-4).

After process 1030, method 1000 includes a process 1040 of providing the output AC power signal to a load when the switch circuit is powered. As an example, the load of process 1040 can be similar to a device plugged in to any of constant "on" outlet(s) 130, controlled outlet(s) 150, or master outlet(s) 240 (FIGS. 2-4).

Next, in some embodiments, method 1000 can include a process 1050 of providing the output AC power signal to a constant power outlet when the output AC power signal is produced. As an example, the constant power outlet of process 1050 can be similar to constant "on" outlet(s) 103 (FIGS. 2-4).

Although the invention has been described with reference to specific embodiments, it will be understood by those skilled in the art that various changes may be made without departing from the scope of the invention. Additional examples of such changes have been given in the foregoing description. Accordingly, the disclosure of embodiments is intended to be illustrative of the scope of the invention and is not intended to be limiting. It is intended that the scope of the invention shall be limited only to the extent required by the appended claims. To one of ordinary skill in the art, it will be readily apparent that the devices and method discussed herein may be implemented in a variety of embodiments, and that the foregoing discussion of certain of these embodiments does not necessarily represent a complete description of all possible embodiments. Rather, the detailed description of the drawings, and the drawings themselves, disclose at least one preferred embodiment, and may disclose alternative embodiments.

Although aspects of the subject matter described herein have been described with reference to specific embodiments, it will be understood by those skilled in the art that various changes may be made without departing from the scope of the subject matter described herein. Accordingly, the disclosure of embodiments is intended to be illustrative of the scope of the subject matter described herein and is not intended to be limiting. It is intended that the scope of the subject matter described herein shall be limited only to the extent required by the appended claims. To one of ordinary skill in the art, it will be readily apparent that the devices and method discussed herein may be implemented in a variety of embodiments, and that the foregoing discussion of certain of these embodiments does not necessarily represent a complete description of all possible embodiments. Rather, the detailed description of the drawings, and the drawings themselves, disclose at least one preferred embodiment, and may disclose alternative embodiments.

All elements claimed in any particular claim are essential to the subject matter described herein and claimed in that particular claim. Consequently, replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A relocatable power tap configured to removably couple to an external device, the relocatable power tap comprising:
   at least one controlled power outlet;
   a power supply circuit configured to receive an input AC power signal and produce a first output AC power signal, the power supply circuit having a first stage and a second stage, the first stage of the power supply circuit configured to produce a first DC power signal and the second stage of the power supply circuit configured to produce a second DC power signal;
   a control circuit in electrical communication with the power supply circuit and configured to receive the first output AC power signal, the first DC power signal, and a command signal, the control circuit including:
  a driver circuit, the driver circuit configured to receive the command signal and produce a control signal based on the command signal; and
  a controlled switching circuit in electrical communication with the driver circuit and configured to receive the first DC power signal as a power source and to receive the first output AC power signal, the controlled switching circuit further configured to receive the control signal from the driver circuit and provide a second output AC power signal to the at least one controlled power outlet based on the control signal; and
an input circuit, the input circuit coupled to the power supply circuit and to the control circuit and configured to receive the second DC power signal and to provide the command signal to the driver circuit of the control circuit, the command signal indicating whether the at least one controlled power outlet is to receive the second output AC power signal,
wherein:
  the at least one controlled power outlet having an input electrically coupled to the controlled switching circuit and an output configured to electrically couple to the external device, the at least one controlled power outlet configured to receive the second output AC power signal from the controlled switching circuit and provide the second output AC power signal to the external device.

2. The relocatable power tap of claim 1, wherein the first stage of the power supply circuit is configured to receive the first output AC power signal, produce the first DC power signal and provide the first DC power signal to the second stage of the power supply circuit, and the second stage of the power supply circuit is configured to produce the second DC power signal from the first DC power signal.

3. The relocatable power tap of claim 1, wherein the first stage of the power supply circuit is configured to receive the first output AC power signal and produce the first DC power signal, and the second stage of the power supply circuit is configured to receive the first output AC power signal and produce the second DC power signal.

4. The relocatable power tap of claim 1, further comprising at least one constant power outlet, wherein the at least one constant power outlet has an input electrically coupled to the power supply circuit and an output configured to electrically couple to the external device, the at least one constant power outlet configured to receive the first output AC power signal from the power supply circuit and provide the received first output AC power signal to the external device.

5. The relocatable power tap of tap of claim 1 wherein the input circuit includes:
  a master power outlet having an input electrically coupled to the power supply circuit;
  a power output configured to electrically couple to the external device; and
  a command output electrically coupled to the control circuit and configured to provide a command signal to the driver circuit of the control circuit.

6. The relocatable power tap of claim 5, wherein the control circuit additionally includes an amplifier circuit, the amplifier circuit is configured to receive the command signal from the master power outlet, amplify the command signal, and pass the command signal to the driver circuit of the control circuit after amplification of the command signal.

7. The relocatable power tap of claim 1, wherein the input circuit includes:
  an antenna, the antenna configured to receive a wireless signal;
  a receiver circuit coupled to the antenna, the receiver circuit configured to receive the wireless signal from the antenna and produce a tuned signal based on the wireless signal; and
  a logic circuit coupled to the receiver circuit, the logic circuit configured to receive the tuned signal from the receiver circuit and produce the command signal based on the tuned signal.

8. The relocatable power tap of claim 1, wherein the input circuit includes:
  a stimuli circuit, the stimuli circuit configured to receive input stimulus and produce an instruction signal based on the input stimulus; and
  a logic circuit coupled to the stimuli circuit, the logic circuit configured to receive the instruction signal from the stimuli circuit and produce the command signal based on the input stimulus.

9. The relocatable power tap of claim 1, wherein the controlled switching circuit includes a switch selected from the group consisting of: an electro-mechanical switch, a solid-state switch, or a vacuum tube switch.

10. The relocatable power tap of claim 1, wherein the first output AC power signal and the second output AC power signal are substantially the same.

11. A relocatable power tap configured to removably couple to one or more external devices, the relocatable power tap comprising:
  at least one controlled power outlet;
  a power supply circuit configured to receive an input AC power signal and produce a first output AC power signal, the power supply circuit comprising a first stage and a second stage, the first stage of the power supply circuit configured to produce a first DC power signal and the second stage of the power supply circuit configured to produce a second DC power signal;
  a control circuit in electrical communication with the power supply circuit and configured to receive the first output AC power signal, the first DC power signal, and a third DC power signal, the control circuit comprising:
    a first internal load configured to receive the first DC power signal; and
    a second internal load configured to receive the third DC power signal;
  and
  an input circuit, the input circuit coupled to the power supply circuit and to the control circuit and configured to receive the second DC power signal and to provide the third DC power signal to the second internal load of the control circuit, the third DC power signal indicating whether the at least one controlled power outlet is to receive a second output AC power signal,
  wherein:
    the at least one controlled power outlet comprises an input electrically coupled to the first internal load and an output configured to electrically couple to the one or more external devices, the at least one controlled power outlet configured to receive the second output AC power signal from the first internal load and provide the second output AC power signal to the one or more external devices.

12. The relocatable power tap of claim 11, wherein the first internal load comprises a controlled switching circuit in electrical communication with the second internal load and configured to receive the first DC power signal as a power source and to receive the first output AC power signal, the controlled switching circuit further configured to receive a fourth DC power signal from the second internal load and provide the second output AC power signal to the at least one controlled power outlet based on the fourth DC power signal.

13. The relocatable power tap of claim 11, wherein the second internal load comprises a driver circuit, the driver circuit configured to receive the third DC power signal and produce a fourth DC power signal based on the third DC power signal.

14. The relocatable power tap of claim 11, wherein:
   the first stage of the power supply circuit comprises a reactive voltage divider circuit, a rectifier circuit, and a shunt regulator circuit;
   the first DC power signal comprises at least a first state and a second state;
   an amplitude of a voltage associated with the first state of the first DC power signal is sufficient to activate the first internal load;
   an amplitude of a voltage associated with the second state of the first DC power signal is sufficient to maintain activation of the activated first internal load; and
   the second stage of the power supply circuit comprises a voltage regulator circuit.

15. The relocatable power tap of claim 11, wherein:
   the first stage of the power supply circuit comprises a reactive voltage divider circuit, a rectifier circuit, and a shunt regulator circuit;
   the first DC power signal comprises at least a first state and a second state;
   an amplitude of a voltage associated with the first state of the first DC power signal is sufficient to activate the first internal load;
   an amplitude of a voltage associated with the second state of the first DC power signal is sufficient to maintain activation of the activated first internal load; and
   the second stage of the power supply circuit comprises a reactive voltage divider circuit, a rectifier circuit, and a voltage regulator circuit.

16. The relocatable power tap of claim 11, further comprising:
   at least one constant-on power outlet configured to receive the first output AC power signal.

17. The relocatable power tap of claim 11, wherein the first internal load comprises a switch selected from the group consisting of: an electro-mechanical switch, a solid-state switch, or a vacuum tube switch.

18. The relocatable power tap of claim 11, further comprising the one or more external devices.

19. The relocatable power tap of claim 11, wherein the first output AC power signal and the second output AC power signal are substantially the same.

20. A method of providing a relocatable power tap configured to removably couple to one or more external devices, the method comprising:
   providing at least one controlled power outlet;
   providing a power supply circuit configured to receive an input AC power signal and produce a first output AC power signal, the power supply circuit comprising a first stage and a second stage, the first stage of the power supply circuit configured to produce a first DC power signal and the second stage of the power supply circuit configured to produce a second DC power signal;
   providing a control circuit in electrical communication with the power supply circuit and configured to receive the first output AC power signal, the first DC power signal, and a command signal, the control circuit comprising:
      a first internal load configured to receive the first DC power signal; and
      a second internal load configured to receive the command signal;
   and
   providing an input circuit, the input circuit coupled to the power supply circuit and to the control circuit and configured to receive the second DC power signal and to provide the command signal to the second internal load of the control circuit, the command signal indicating whether the at least one controlled power outlet is to receive a second output AC power signal,
   wherein:
      the at least one controlled power outlet comprising an input electrically coupled to the first internal load and an output configured to electrically couple to the one or more external devices, the at least one controlled power outlet configured to receive the second output AC power signal from the first internal load and provide the second output AC power signal to the one or more external devices.

21. The method of claim 20, wherein providing the first internal load comprises providing a controlled switching circuit in electrical communication with the second internal load and configured to receive the first DC power signal as a power source and to receive the first output AC power signal, the controlled switching circuit further configured to receive a control signal from the second internal load and provide the second output AC power signal to the at least one controlled power outlet based on the control signal.

22. The method of claim 20, wherein providing the second internal load comprises providing a driver circuit, the driver circuit configured to receive the command signal and produce a control signal based on the command signal.

23. The method of claim 20, wherein the first output AC power signal and the second output AC power signal are substantially the same.

24. A relocatable power tap configured to removably couple to one or more external devices, the relocatable power tap comprising:
   at least one controlled power outlet;
   a power supply circuit configured to receive an input AC power signal and produce a first output AC power signal, the power supply circuit having a first stage and a second stage, the first stage of the power supply circuit configured to produce a first DC power signal and the second stage of the power supply circuit configured to produce a second DC power signal;
   a control circuit in electrical communication with the power supply circuit and configured to receive the first output AC power signal, the first DC power signal, and a command signal, the control circuit comprising:
      a driver circuit, the driver circuit configured to receive the command signal and produce a control signal based on the command signal; and
      a controlled switching circuit in electrical communication with the driver circuit and configured to receive the first DC power signal as a power source and to receive the first output AC power signal, the controlled switching circuit further configured to receive the control signal from the driver circuit and provide a second output AC power signal to the at least one controlled power outlet based on the control signal;
   and an input circuit, the input circuit coupled to the power supply circuit and to the control circuit and configured to receive the second DC power signal and to provide the command signal to the driver circuit of the control circuit, the command signal indicating whether the at least one controlled power outlet is to receive the second output AC power signal, wherein:

the at least one controlled power outlet comprises an input electrically coupled to the controlled switching circuit and an output configured to electrically couple to the one or more external devices, the at least one controlled power outlet configured to receive the second output AC power signal from the controlled switching circuit and provide the second output AC power signal to the one or more external devices;

the input circuit comprises:

a stimuli circuit, the stimuli circuit configured to receive input stimulus and produce an instruction signal based on the input stimulus; and a logic circuit coupled to the stimuli circuit, the logic circuit configured to receive the instruction signal from the stimuli circuit and produce the command signal based on the input stimulus;

the controlled switching circuit comprises a switch selected from the group consisting of: an electromechanical switch, a solid-state switch, or a vacuum tube switch;

the power supply circuit comprises a transformer comprising at least a primary winding and two or more secondary windings;

the transformer is configured to receive the first output AC power signal;

the first stage of the power supply circuit is reactively coupled and in electrical communication with a first secondary winding of the two or more secondary windings;

the first stage of the power supply comprises a first rectifier circuit and an energy storage circuit;

the first DC power signal comprises at least a first state and a second state;

an amplitude of a voltage associated with the first state of the first DC power signal is sufficient to activate the controlled switching circuit;

an amplitude of a voltage associated with the second state of the first DC power signal is sufficient to maintain activation of the controlled switching circuit;

the second stage of the power supply is in electrical communication with a second secondary winding of the two or more secondary windings; and the second stage of the power supply comprises a second rectifier circuit and a voltage regulator circuit.

25. The relocatable power tap of claim 24, wherein the first stage of the power supply circuit is configured to receive the first output AC power signal, produce the first DC power signal and provide the first DC power signal to the second stage of the power supply circuit, and the second stage of the power supply circuit is configured to produce the second DC power signal from the first DC power signal.

26. The relocatable power tap of claim 24, wherein the first stage of the power supply circuit is configured to receive the first output AC power signal and produce the first DC power signal, and the second stage of the power supply circuit is configured to receive the first output AC power signal and produce the second DC power signal.

27. The relocatable power tap of claim 24, wherein the first output AC power signal and the second output AC power signal are substantially the same.

* * * * *